(12) United States Patent
Shimotani et al.

(10) Patent No.: US 10,933,745 B2
(45) Date of Patent: Mar. 2, 2021

(54) DISPLAY CONTROL APPARATUS, DISPLAY APPARATUS, AND DISPLAY CONTROL METHOD

(71) Applicant: MITSUBISHI ELECTRIC CORPORATION, Tokyo (JP)

(72) Inventors: Mitsuo Shimotani, Tokyo (JP);
Yoshitaka Nakamura, Tokyo (JP);
Tadashi Miyahara, Tokyo (JP);
Naohiko Obata, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 46 days.

(21) Appl. No.: 16/320,456

(22) PCT Filed: Oct. 26, 2016

(86) PCT No.: PCT/JP2016/081662
§ 371 (c)(1),
(2) Date: Jan. 24, 2019

(87) PCT Pub. No.: WO2018/078732
PCT Pub. Date: May 3, 2018

(65) Prior Publication Data
US 2019/0263263 A1 Aug. 29, 2019

(51) Int. Cl.
*B60K 35/00* (2006.01)
*B60W 50/14* (2020.01)
(Continued)

(52) U.S. Cl.
CPC ............ *B60K 35/00* (2013.01); *B60W 30/10* (2013.01); *B60W 50/14* (2013.01); *G05D 1/021* (2013.01);
(Continued)

(58) Field of Classification Search
CPC ............ B60K 35/00; B60K 2370/1529; B60K 2370/175; B60K 2370/193; B60W 30/10;
(Continued)

(56) References Cited

U.S. PATENT DOCUMENTS 6,327,522 B1 * 12/2001 Kojima ................. B60K 35/00
701/1
2007/0032914 A1 2/2007 Kondoh et al.
(Continued)

FOREIGN PATENT DOCUMENTS

JP 10-105885 A 4/1998
JP 2007-45175 A 2/2007
(Continued)

OTHER PUBLICATIONS

International Search Report for PCT/JP2016/081662 (PCT/ISA/210) dated Jan. 24, 2017.

*Primary Examiner* — Jonathan M Dager
*Assistant Examiner* — Jean W Charleston
(74) *Attorney, Agent, or Firm* — Birch, Stewart, Kolasch & Birch, LLP.

(57) ABSTRACT

A display control apparatus controls a display used in a vehicle which can travel with automatic driving. The display control apparatus includes an information acquirer and a controller. The information acquirer acquires information of a travel control plan generated by an automatic driving control device of the vehicle. The controller acquires a future position which is a position of the vehicle after an elapse of a predetermined time from a current position of the vehicle from a future movement of the vehicle planned by the travel control plan, and controls the display so that a user is visually provided with the future position of the vehicle by overlapping a vehicle object which is a display object imitating a vehicle shape with a landscape relating to the future position which is acquired.

19 Claims, 31 Drawing Sheets

(51) Int. Cl.
 *G05D 1/02* (2020.01)
 *G08G 1/16* (2006.01)
 *B60W 30/10* (2006.01)

(52) U.S. Cl.
 CPC ........ *G08G 1/16* (2013.01); *B60K 2370/1529* (2019.05); *B60K 2370/175* (2019.05); *B60W 2050/146* (2013.01)

(58) Field of Classification Search
 CPC ............ B60W 50/14; B60W 2050/146; G05D 1/021; G08G 1/16
 USPC .......................................................... 701/36
 See application file for complete search history.

(56) References Cited

U.S. PATENT DOCUMENTS

| | | | | |
|---|---|---|---|---|
| 2009/0112452 A1* | 4/2009 | Buck | .................. | G08G 1/09675 701/117 |
| 2012/0173069 A1* | 7/2012 | Tsimhoni | ............. | G01C 21/365 701/25 |
| 2014/0297181 A1* | 10/2014 | Kondo | ............... | G01C 21/3658 701/532 |
| 2014/0309870 A1* | 10/2014 | Ricci | ....................... | G01S 19/42 701/36 |
| 2015/0032290 A1* | 1/2015 | Kitahama | .............. | G08G 1/166 701/1 |
| 2016/0052394 A1* | 2/2016 | Yamada | ................ | G06T 19/006 701/93 |
| 2016/0129836 A1* | 5/2016 | Sugita | ................ | B62D 15/0295 701/41 |
| 2016/0167514 A1* | 6/2016 | Nishizaki | ............... | G02B 27/01 345/7 |
| 2017/0225702 A1* | 8/2017 | Yamada | ................ | G06F 3/04883 |
| 2018/0058879 A1* | 3/2018 | Tayama | ................ | B60W 30/12 |

FOREIGN PATENT DOCUMENTS

| | | | |
|---|---|---|---|
| JP | 2007-272350 A | | 10/2007 |
| JP | 2007272350 A | * | 10/2007 |
| JP | 2015-49059 A | | 3/2015 |
| JP | 2015049059 A | * | 3/2015 |
| WO | WO 2016/152553 A1 | | 9/2016 |

* cited by examiner

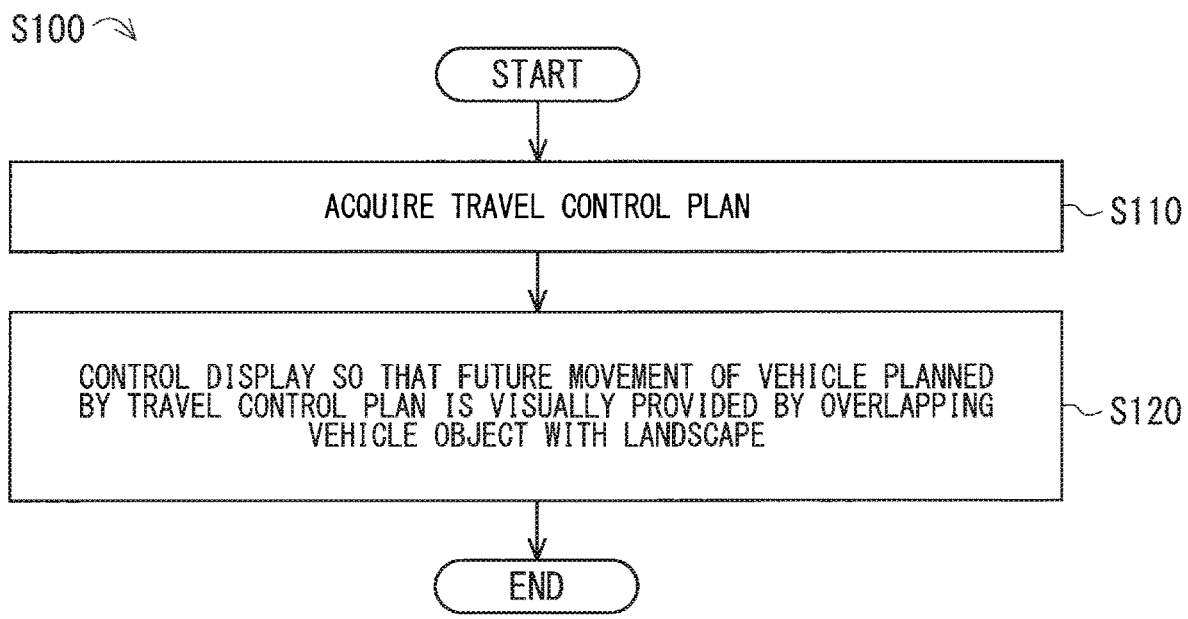
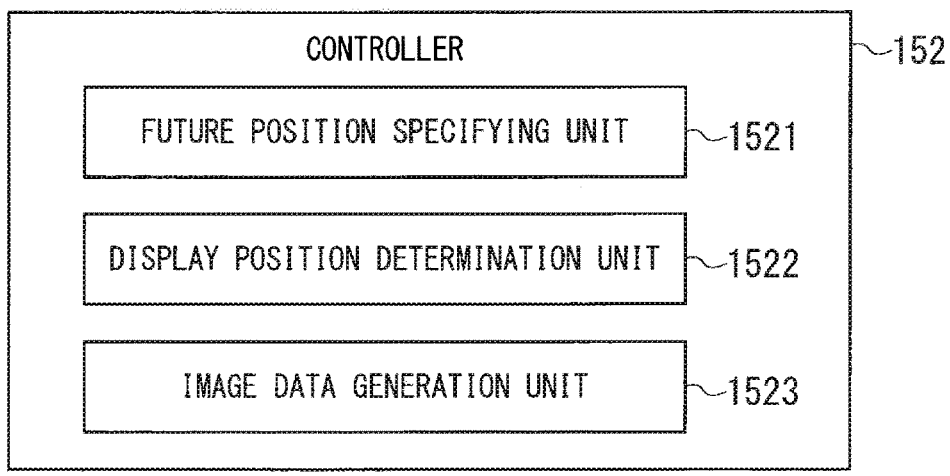

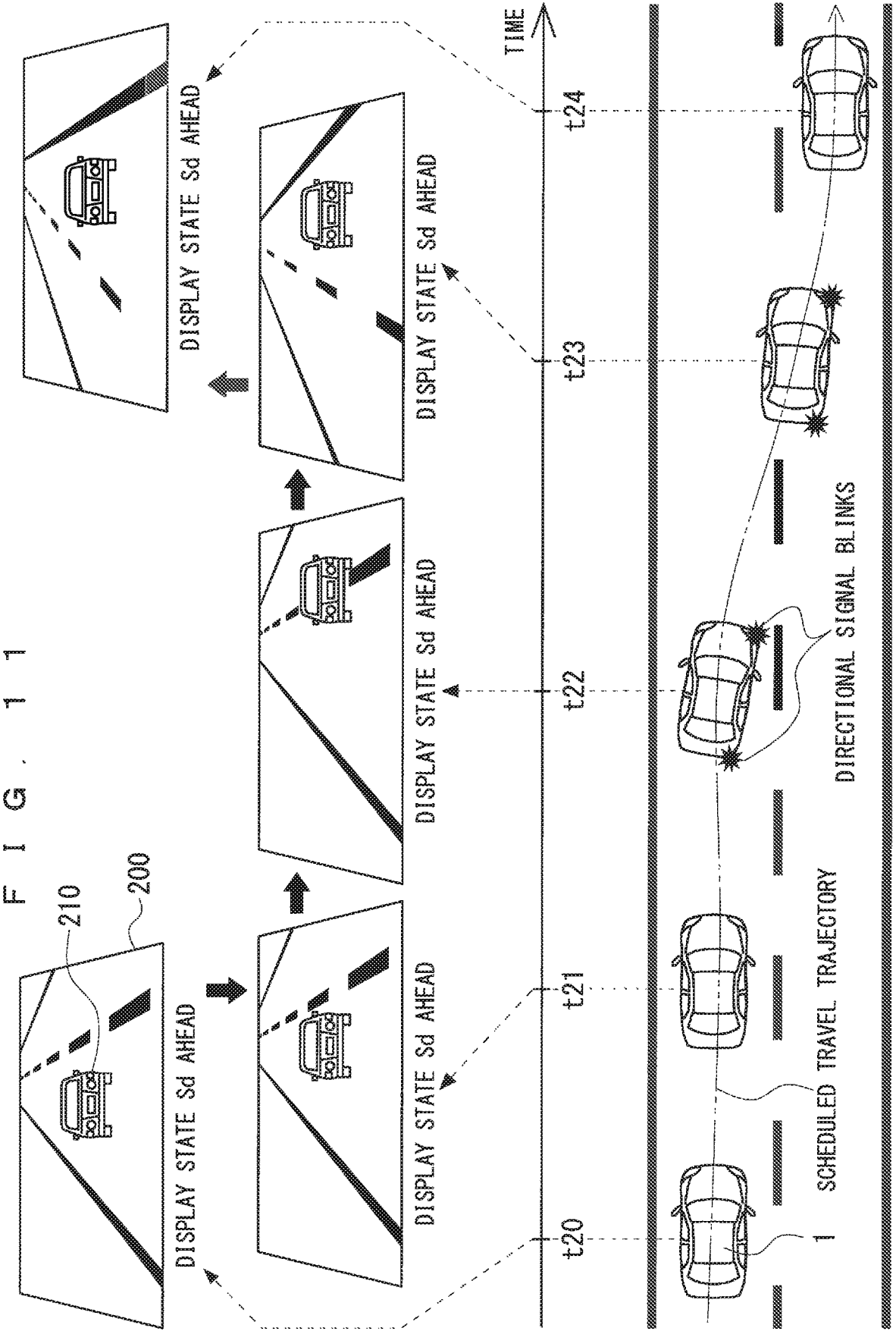

F I G . 1 2
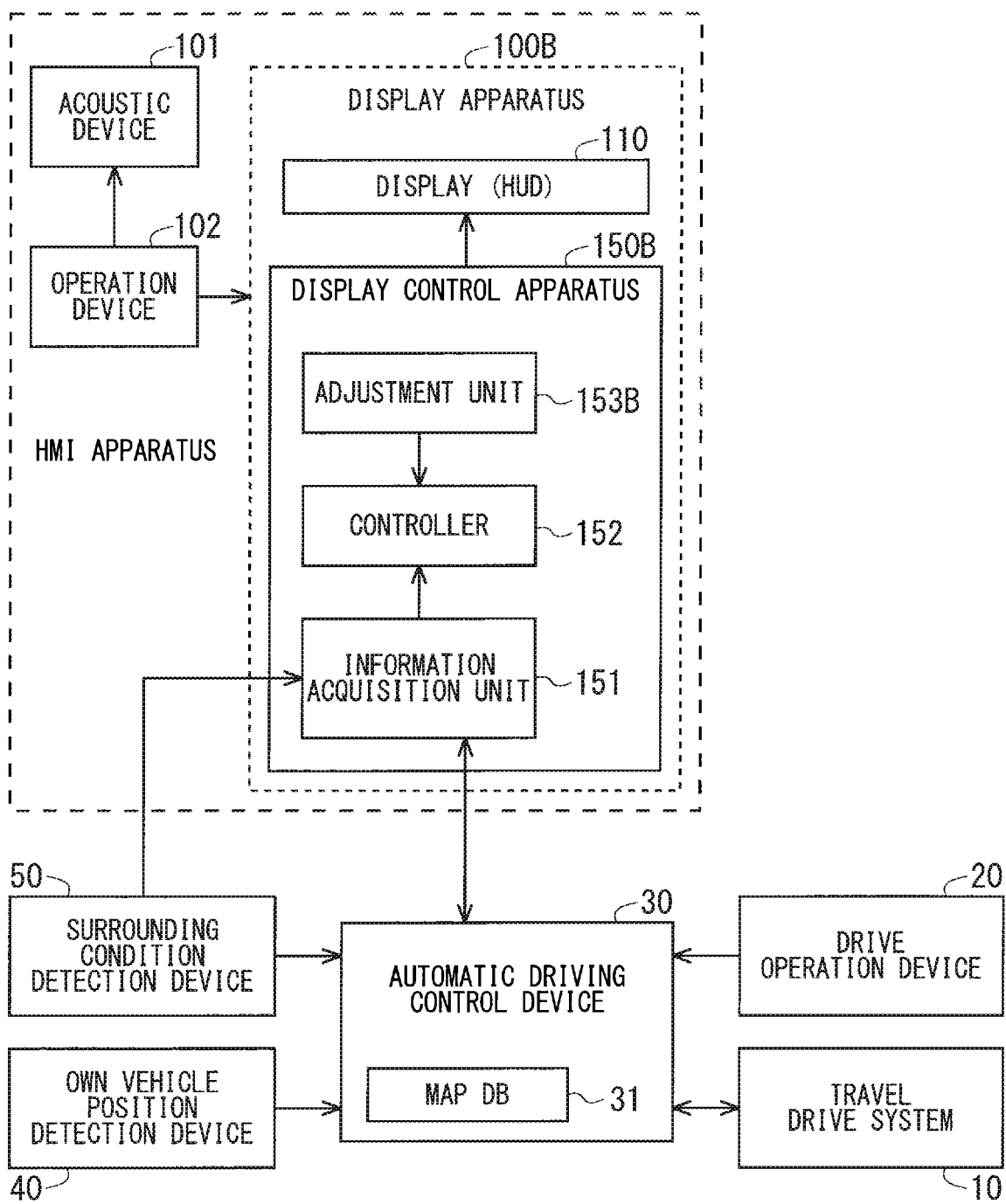

F I G . 2 5
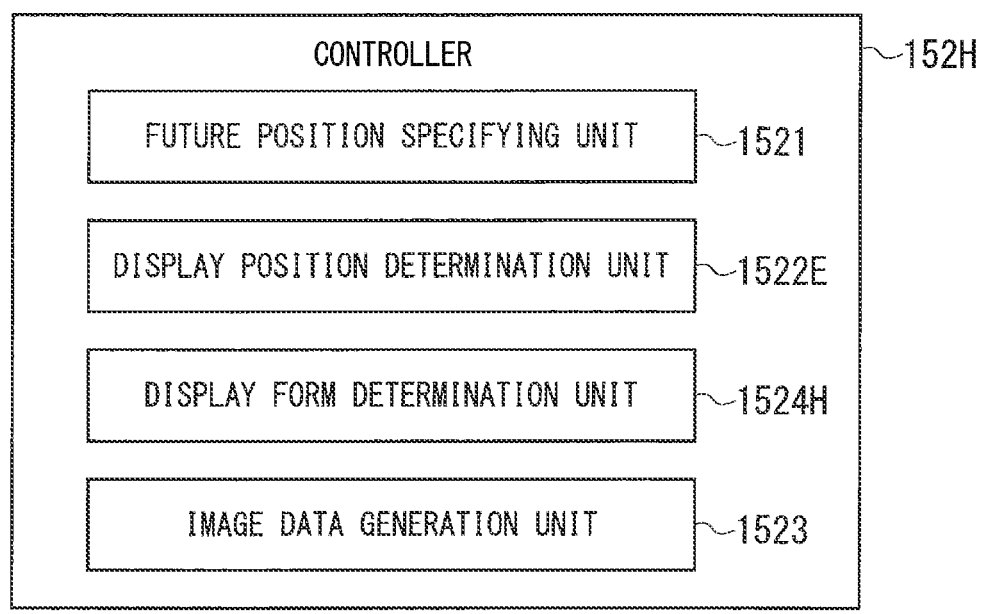

F I G . 3 8
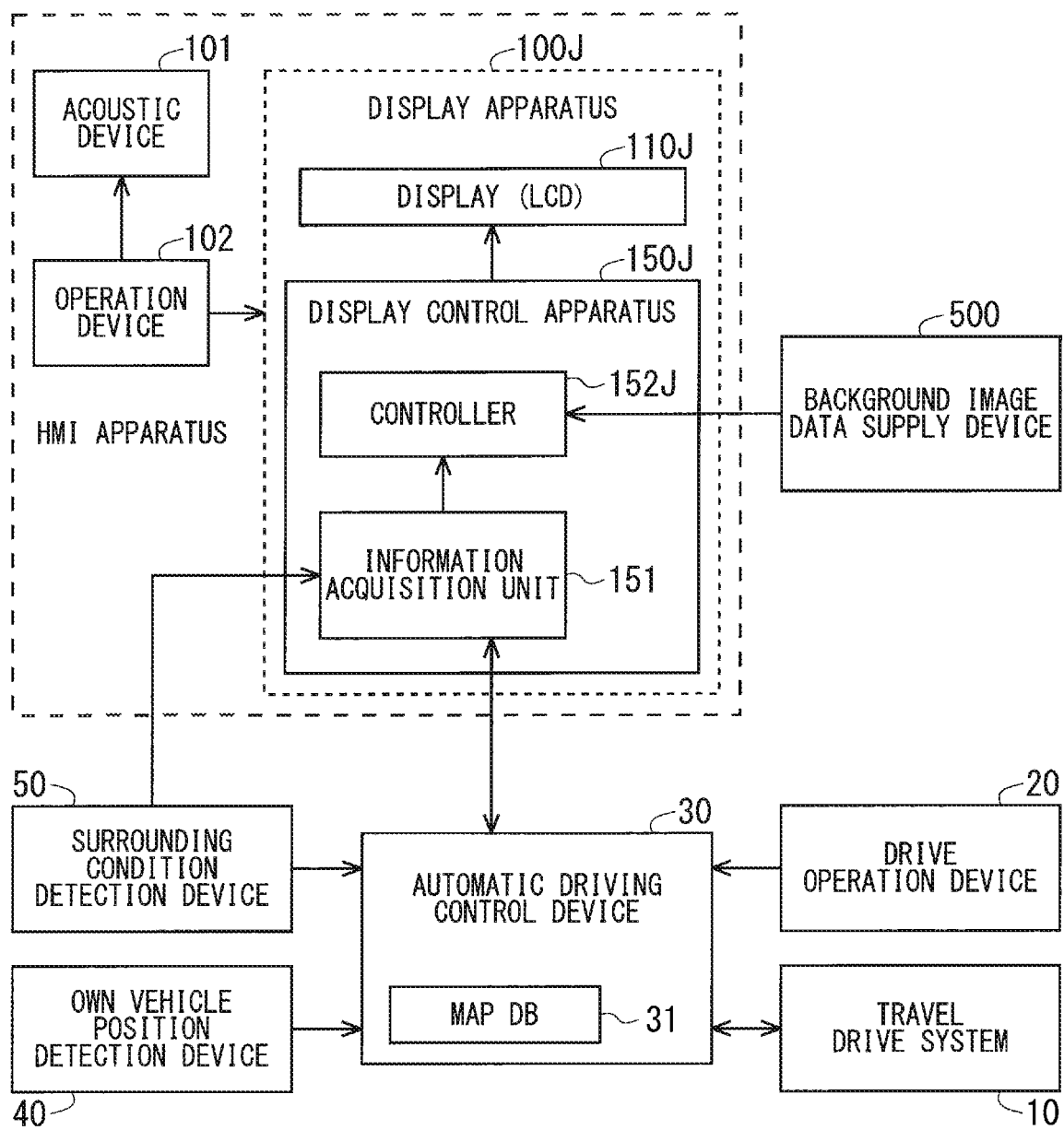

DISPLAY CONTROL APPARATUS, DISPLAY APPARATUS, AND DISPLAY CONTROL METHOD

TECHNICAL FIELD

The present invention relates to a technique of controlling a display used in a vehicle which can travel with automatic driving.

BACKGROUND ART

Patent Document 1 discloses a technique of transmitting a notification of a behavior which an own vehicle will take next. Specifically, a calculation control unit receives information of a position of the other vehicle which automatically travels around the own vehicle via an inter-vehicle communication to display marks indicating the own vehicle and the surrounding other vehicle with a relative positional relationship on a screen of a display of the own vehicle. Each of the marks indicating the own vehicle and the other vehicle has a pentagon shape with a single sharp angle, and a direction in which the sharp angle is directed indicates a travel direction of the own vehicle and the other vehicle.

Patent Document 1 discloses a technique of transmitting a notification of a behavior which the other vehicle will take next. Specifically, a calculation control unit receives information of a travel plan from the other vehicle to set a relative positional relationship of marks indicating the own vehicle and the other vehicle based on the travel plan of the other vehicle.

The calculation control unit transmits a notification of the behavior which each of the own vehicle and the other vehicle will take next with a voice sound. For example, a voice sound of "merge into a right lane", "move to a left lane", and "stop at 100 meters ahead" is output on the behavior which the own vehicle will take next.

Patent Document 2 discloses a technique of preannouncing a control actuation state of a vehicle to a driver. Specifically, a drive operation assist device performs an accelerator pedal operation reaction force control in accordance with a risk potential expressing a degree of proximity of the own vehicle to a front obstacle and an automatic braking control in accordance with a possibility of contact of the own vehicle with the front obstacle. When the automatic braking control transitions from a low actuation state to a high actuation state in a state where an operation reaction force is generated on an accelerator pedal in accordance with the risk potential, the drive operation assist device generates, a predetermined period of time before the transition, a pulse of an additional reaction force from the accelerator pedal and a single-shot warning sound.

PRIOR ART DOCUMENTS

Patent Documents

Patent Document 1: Japanese Patent Application Laid-Open No. 10-105885
Patent Document 2: Japanese Patent Application Laid-Open No. 2007-45175

SUMMARY

Problem to be Solved by the Invention

According to the technique of Patent Document 1, the notification of the behavior which the own vehicle and the other vehicle will take next is only transmitted in a simplified manner. Thus, it is considered that the driver has difficulty understanding concreteness of a position of the own vehicle and a behavior the own vehicle will take at the position. According to the technique of Patent Document 2, the notification is not transmitted if the condition of the automatic braking control transitioning to the high actuation state is not predicted.

An object of the present invention is to visually provide a user with a future behavior of a vehicle concretely.

Means to Solve the Problem

A display control apparatus according to the present invention is a display control apparatus controlling a display being used in a vehicle which can travel with automatic driving, including: an information acquirer to acquire information of a travel control plan being generated by an automatic driving control device of the vehicle; and a controller to acquire a future position which is a position of the vehicle after an elapse of a predetermined time from a current position of the vehicle from a future movement of the vehicle being planned by the travel control plan, and to control the display so that a user is visually provided with the future position of the vehicle by overlapping a vehicle object which is a display object imitating a vehicle shape with a landscape relating to the future position which is acquired.

A display control method according to the present invention is a method of controlling a display being used in a vehicle which can travel with automatic driving, including: acquiring information of a travel control plan being generated by an automatic driving control device of the vehicle; and acquiring a future position which is a position of the vehicle after an elapse of a predetermined time from a current position of the vehicle from a future movement of the vehicle being planned by the travel control plan, and controlling the display so that a user is visually provided with the future position of the vehicle by overlapping a vehicle object which is a display object imitating a vehicle shape with a landscape relating to the future position which is acquired.

Effects of the Invention

According to the present invention, the future movement of the vehicle is visually provided by overlapping the vehicle object which is the display object imitating the vehicle shape with the landscape relating to the future movement. Thus, the future movement of the vehicle can be understood more specifically.

These and other objects, features, aspects and advantages of the present invention will become more apparent from the following detailed description of the present invention when taken in conjunction with the accompanying drawings.

BRIEF DESCRIPTION OF DRAWINGS

FIG. 5 A flow chart for describing an operation of the display control apparatus according to the embodiment 1.

FIG. 6 A block diagram for describing a configuration of a controller of the display control apparatus according to the embodiment 1.

FIG. 11 A diagram for describing another operation of the display control apparatus according to the embodiment 1.

FIG. 12 A block diagram for describing a display control apparatus according to an embodiment 2 and an example of application thereof.

FIG. 25 A block diagram for describing a configuration of a controller of a display control apparatus according to an embodiment 8.

FIG. 38 A block diagram for describing a display control apparatus according to an embodiment 10 and an example of application thereof.

DESCRIPTION OF EMBODIMENT(S)

Embodiment 1

<Whole Configuration>

Figure 1:
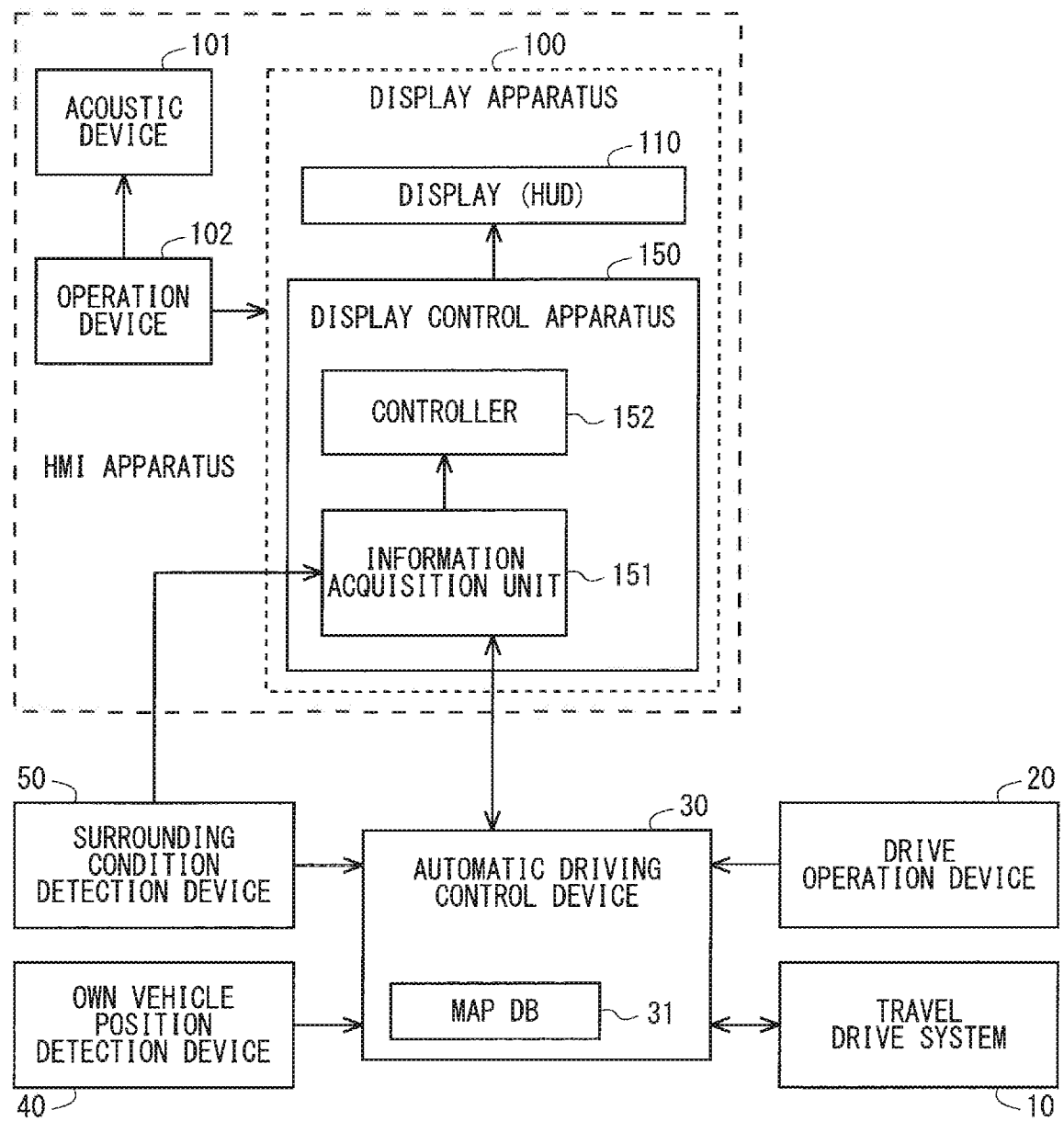
FIG. 1 A block diagram for describing a display control apparatus according to an embodiment 1 and an example of application thereof.

FIG. 1 illustrates a block diagram for describing a display control apparatus 150 according to an embodiment 1 and an example of application thereof. The display control apparatus 150 is an apparatus controlling a display 110 used in a vehicle which can travel with automatic driving. Herein, the display control apparatus 150 and the display 110 are mounted on the vehicle. The vehicle may be a moving body. Specifically, the vehicle is not limited by a type of vehicle, a drive system, and an energy type, for example, but may be any of a gasoline vehicle, an electric vehicle, and a hybrid vehicle, for example. A vehicle to which the display control apparatus 150 is applied is referred to as an own vehicle, and a vehicle other than the own vehicle is referred to as the other vehicle in some cases hereinafter.

The display control apparatus 150 is combined with the display 110, thereby being able to constitute a display apparatus 100. The display apparatus 100 solely or combined with the other apparatus can constitute a human machine interface (HMI) apparatus. FIG. 1 illustrates an example of the display apparatus 100 constituting the HMI apparatus with an acoustic device 101 and an operation device 102. The HMI apparatus in FIG. 1 is an apparatus outputting information to a user and receiving an operation performed by the user. Specifically, the display apparatus 100 visually provides information, and the acoustic device 101 aurally provides information. The operation device 102 receives user operation for the display apparatus 100 and the acoustic device 101. Any operation device such as a touch panel, a switch, and a button falls under the operation device 102. The user is a driver hereinafter, however, the user may be a passenger.

FIG. 1 illustrates a travel drive system 10, a drive operation device 20, an automatic driving control device 30, an own vehicle position detection device 40, and a surrounding condition detection device 50 for explanation.

The travel drive system 10 is a device for making the vehicle to travel, and includes an acceleration device, a steering device, and a braking device. The travel drive system 10 may include a device used for the travel of the vehicle, such as a directional signal, for example, in some cases. The travel drive system 10 is under control of the automatic driving control device 30. The travel drive system 10 detects an operation condition of the travel drive system 10 using various sensors, and provides the automatic driving control device 30 with a detection result. Information of the detection result is used when the automatic driving control device 30 controls the travel drive system 10.

If the vehicle is provided with a control authority of the travel drive system 10, in other words, a drive authority of the vehicle, the automatic driving control device 30 autonomously controls the travel drive system 10. In view of that point, a state where the vehicle has the drive authority may be described as a state where the automatic driving control device 30 has the drive authority. In the meanwhile, if the driver of the vehicle has the drive authority, the driver operates the drive operation device 20, thereby controlling the travel drive system 10.

The drive operation device 20 is a device used by the driver to drive the vehicle. The drive operation device 20 includes a device for the driver to operate the travel drive system 10, such as a steering wheel, an accelerator pedal, and a brake pedal, for example.

The drive operation device 20 includes a device for the driver to input an instruction relating to the driving to the vehicle, such as a handle lever and a directional signal lever, for example. Contents of the operation performed by the drive operation device 20 are input to the automatic driving control device 30. If the driver has the drive authority, the automatic driving control device 30 controls the travel drive system 10 based on the contents of the operation.

The automatic driving control device 30 has a map database 31. The database is referred to as the DB in some cases hereinafter. The map DB 31 is used for the automatic driving, has high-accuracy map data, and further has data useful for the automatic driving, such as road data, for example. The road data is data on clarity of a compartment line drawn on a road surface, for example. The map DB 31 may be provided on Internet, and in this case, the automatic driving control device 30 accesses the map DB 31 via Internet.

The automatic driving control device 30 generates a relatively long-term travel control plan on a scheduled travel route of the own vehicle with reference to the map DB 31. The scheduled travel route can be set as a road network in a predetermined range from a current position of the own vehicle detected by the own vehicle position detection device 40. Alternatively, a guide route being set by a navigation system may be set to the scheduled travel route.

Herein, the own vehicle position detection device 40 is made up of a global positioning system (GPS) receiver, for example, detects the current position of the own vehicle, that is to say, the own vehicle position, and provides the automatic driving control device 30 with a detection result. The current position can be expressed by latitude, longitude, and altitude, for example. The own vehicle position detection device 40 may have a configuration to acquire the own vehicle position from information of an acceleration sensor, a gyroscope, and a vehicle speed signal in place of or in addition to GPS reception information.

The automatic driving control device 30 generates a relatively short-term travel control plan based on information of a surrounding condition of the own vehicle in addition to the information of the map DB 31 and the information of the own vehicle position. The surrounding condition detection device 50 detects surrounding condition.

The surrounding condition detection device 50 detects the surrounding condition of the own vehicle, and provides the automatic driving control device 30 with a detection result. The surrounding condition detection device 50 has sensing devices such as a millimeter-wave radar, an ultrasonic sensor, a laser radar, and a camera, for example, and uses these sensing devices to acquire information used for the automatic driving. For example, positional information of a traffic lane (in other words, a compartment line on a road surface), the other vehicle, a pedestrian, a building, and an obstacle is acquired. Herein, the positional information of the own vehicle in the traffic lane can be acquired from the positional information of the compartment line (for example, a difference of distances to left and right compartment lines). A movement speed of an object which is moving is detected. The surrounding condition detection device 50 may acquire the information of the surrounding condition of the own vehicle using an in-vehicle communication device. Specifically, information of congestion degree and road condition can be acquired by an inter-vehicle communication which is a communication between the own vehicle and the other vehicle, a roadside-to-vehicle communication which is a communication between the own vehicle and a roadside device, and a broadcast reception, for example.

The surrounding condition information detected by the surrounding condition detection device 50 is used by the automatic driving control device 30 to avoid a collision and keep the traffic lane (in other words, the lane keeping), for example. In view of that point, the short-term travel control plan relates to an extent of a detection range detected by the surrounding condition detection device 50. In contrast, the long-term travel control plan is directed to a range beyond the detection range detected by the surrounding condition detection device 50, and relates to a future long-term travel assumable based on the map DB 31, for example. Since the short-term travel control plan is generated based on the surrounding condition information, the short-term travel control plan is more detailed than the long-term travel control plan.

The travel control plan includes information of a scheduled travel trajectory. In the scheduled travel trajectory, a relatively long-term scheduled travel trajectory is provided by the long-term travel control plan described above, and a relatively short-term scheduled travel trajectory is provided by the short-term travel control plan described above. Since the short-term travel control plan is more detailed than the long-term travel control plan as described above, the short-term scheduled travel trajectory is more detailed than the long-term scheduled travel trajectory. For example, the short-term scheduled travel trajectory is generated with an accuracy capable of specifying the position of the own vehicle in the traffic lane.

The scheduled travel trajectory can be generated by a function having a time as a variable. Thus, if a value of a certain time is assigned, information regarding where the vehicle is located on the scheduled travel trajectory at that time can be acquired. According to this, if a value of a future time is assigned, a future position of the vehicle at the future time can be estimated. Herein, the future time indicates a time coming after the current time. The future position indicates a point in an actual space where the vehicle is estimated to reach at the future time. The future position can be expressed by latitude, longitude, and altitude, for example.

The travel control plan includes information of a control plan of the travel drive system 10 in a case where the vehicle moves along the scheduled travel trajectory, such as information of a control plan of each of an acceleration device, a steering device, and a braking device, for example. The travel control plan may include a control plan of a directional signal.

<Display 110>

The display 110 is a head-up display (HUD) using a windshield in front of a driver seat. The display 110 is referred to as the HUD 110 in some cases hereinafter. The HUD 110 provides the driver with an image displayed by the HUD 110 as a virtual image. Specifically, when the HUD 110 projects the image toward the windshield, the projected image appears on an actual landscape viewed through the windshield as the virtual image. Thus, the displayed image is seen as if it is in a landscape in front of the vehicle. In other words, the driver is provided with an image formed of the image being output by the HUD 110 overlapped with the actual landscape, and thereby recognizes the overlapped image.

Used in the embodiment 1 as the HUD 110 is an HUD having a specification that a virtual image distance, that is to say, a distance of the virtual image viewed from the driver (more specifically, a distance in a longitudinal direction) is constant.

Figure 2:
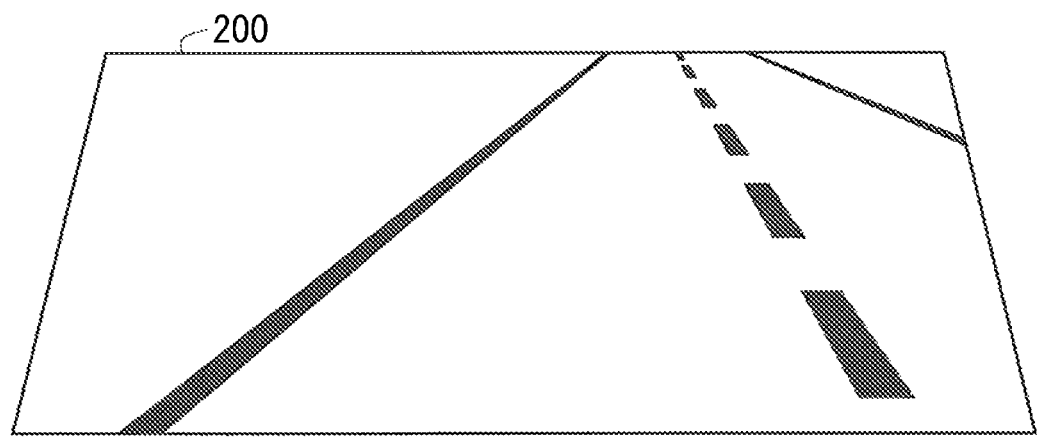
FIG. 2 A drawing illustrating an example of an actual landscape viewed through a windshield.
Figure 3:
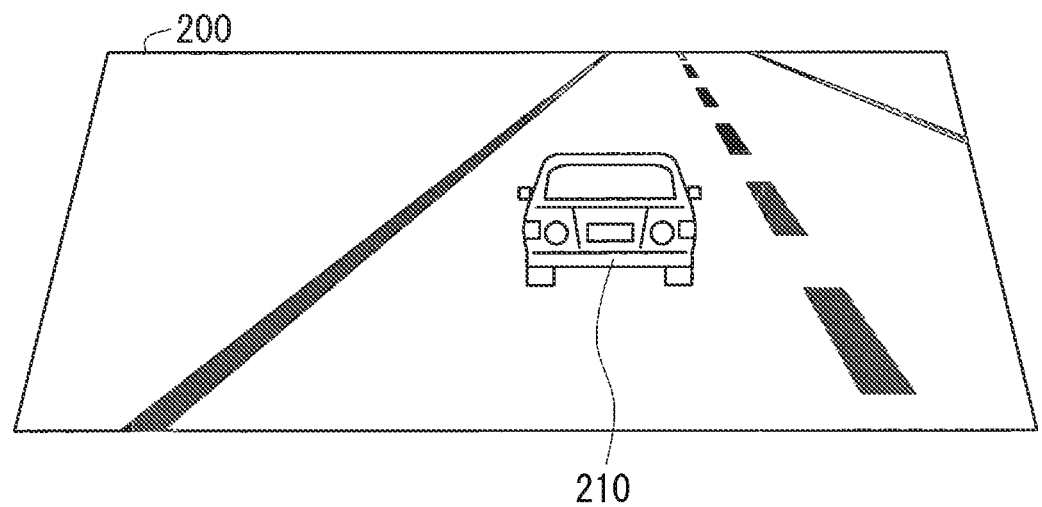
FIG. 3 A drawing for describing an appearance of a vehicle object overlapped with the actual landscape in FIG. 2 by a head-up display.

FIG. 2 illustrates an example of the actual landscape viewed through a windshield 200. FIG. 3 illustrates an appearance of a display object 210 overlapped with the actual landscape in FIG. 2 by the HUD 110.

<Display Control Apparatus 150>

The display control apparatus 150 controls the HUD 110. Specifically, the display control apparatus 150 generates data of the image displayed by the HUD 110 and provides the HUD 110 with the generated image data. The HUD 110 performs a display operation based on the provided image data.

As illustrated in FIG. 3, the HUD 110 displays the display object 210 which imitates a vehicle shape. The imitated vehicle shape has a shape of the own vehicle, but is not limited thereto. The display object 210 in FIG. 3 imitates a back view of the vehicle. The display object 210 is referred to as the vehicle object 210 in some cases hereinafter. In this case, the display control apparatus 150 sets a display position of the vehicle object 210 in a display region defined by the HUD 110, in other words, in a display region of the virtual image, and generates the image data for displaying the vehicle object 210 in the display position.

Figure 4:
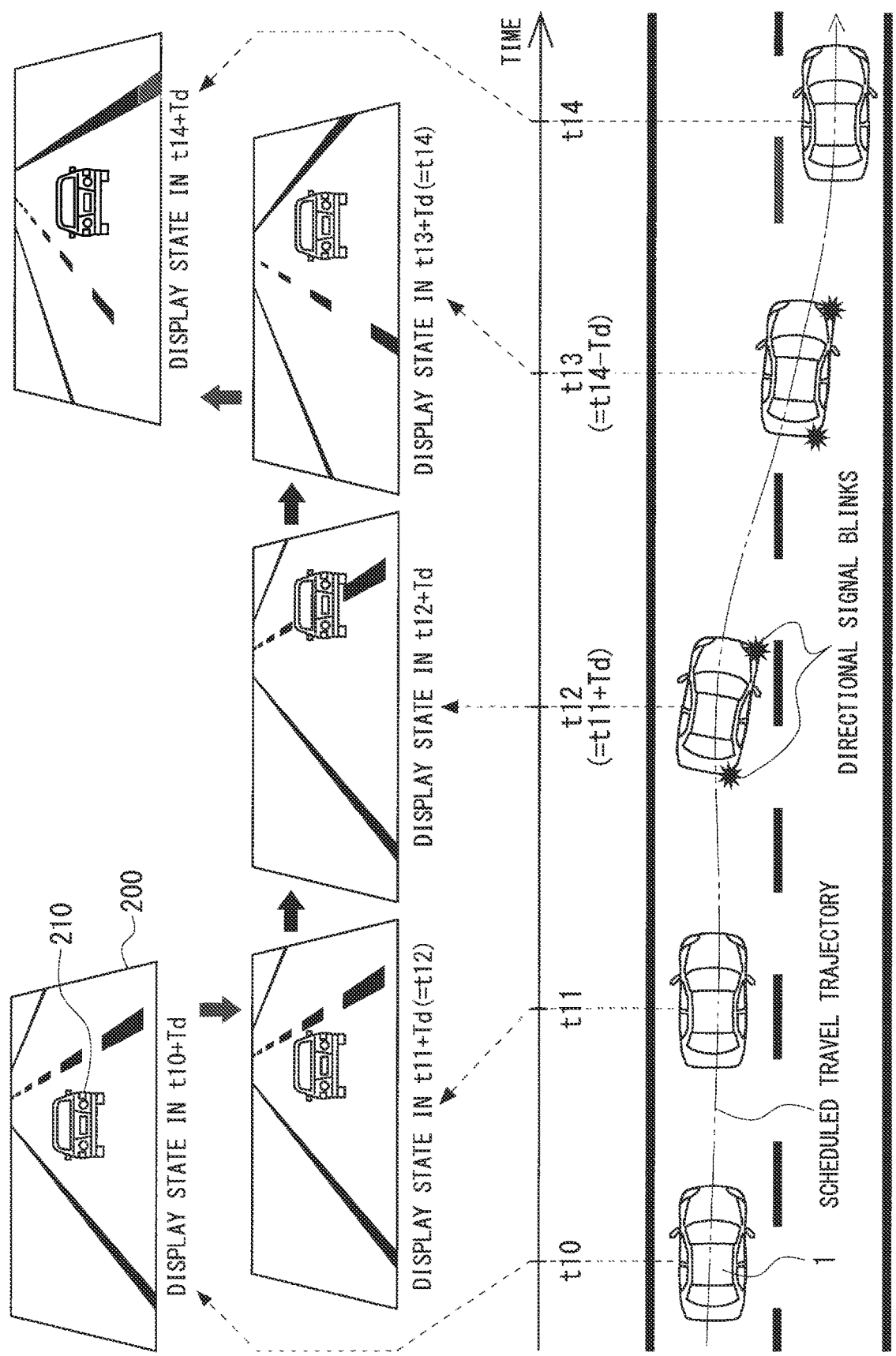
FIG. 4 A diagram for describing a display according to the embodiment 1.

Particularly, the display control apparatus 150 has a function of displaying a future movement of the own vehicle using the vehicle object 210. FIG. 4 illustrates an example. FIG. 4 illustrates a vehicle 1 making a lane change in accordance with a travel control plan, in other words, a scheduled travel trajectory as shown in a lower side of FIG. 4. FIG. 4 illustrates the actual landscape viewed through the windshield 200 and the vehicle object 210 displayed by the HUD 110 in an upper side of FIG. 4. A scale including t10 to t14 in a time axis shown in a middle side of FIG. 4 is illustrated to correspond to a position of the vehicle 1 in the lower side of FIG. 4. Thus, a length of Td (a length from t11 to t12 and a length from t13 to t14 fall under the length of the Td) in the time axis is not equally illustrated in some cases.

Herein, an actual landscape at a current time is viewed through the windshield 200. In the meanwhile, the vehicle object 210 is displayed in a future position in a future time. Thus, a simulated (in other words, a fictive) state in the future time is visually provided through the windshield 200. As described above, the future position can be estimated based on the travel control plan, more specifically, the scheduled travel trajectory.

With reference to FIG. 4, when the current time is a time t11 at which the lane change is started, the vehicle object 210 is displayed in the future position in a future time t11+Td (=t12). That is to say, according to the scheduled travel trajectory, the vehicle 1 is planned to travel in a left lane and move toward a side of a center line at the future time t11+Td (=t12). In order to correspond thereto, in the current time t11, the vehicle object 210 is displayed in a position closer to an actual center line viewed through the windshield 200.

The Td indicates a difference between the current time and the future time. Herein, the Td is set to five seconds and cannot be changed, but is not limited thereto.

When the current time is t12, the vehicle object 210 is displayed in a future position in a future time t12+Td. In the future time t12+Td, the vehicle 1 is planned to cross the center line. In order to correspond thereto, in the current time t12, the vehicle object 210 is displayed to overlap with the actual center line viewed through the windshield 200.

If the lane change is planned to be finished at the time t14, the vehicle object 210 is displayed in a future position in the future time t14 at a current time t14−Td (=t13). That is to say, at the current time t13 (=t14−td), the vehicle object 210 is displayed to be located in an actual right lane viewed through the windshield 200.

The same applies to a state where the vehicle 1 travels in the same traffic lane. Specifically, at the time t10 (>t11) before the lane change is started, the vehicle object 210 is displayed in a future position in a future time t10+Td. In this case, the future position is located in the left lane where the vehicle 1 currently travels, thus the vehicle object 210 is displayed to be located in an actual left lane viewed through the windshield 200 at the time t10. The same applies to a state in a time after the lane change is finished, and FIG. 4 typically illustrates the display at the time t14.

The vehicle object 210 is also displayed in the similar manner in a state of turning right and left, for example.

The display control apparatus 150 is described more specifically hereinafter. As illustrated in FIG. 1, the display control apparatus 150 includes an information acquisition unit 152 and a controller 152.

The information acquisition unit 151 acquires various types of information used for operating the display control apparatus 150. According to an operation flow S100 illustrated in FIG. 5, in Step S110, the information acquisition unit 151 acquires information of the travel control plan generated by the automatic driving control device 30 from the automatic driving control device 30.

The controller 152 performs various types of processing in the display control apparatus 150. Particularly, as illustrated in FIG. 5, in Step S120, the controller 152 controls the display 110 (the HUD 110 herein) to visually provide the user with the future movement of the vehicle 1 planned by the travel control plan acquired in Step S110 using the display of the vehicle object 210. Particularly, the controller 152 controls the HUD 110 so that the vehicle object 210 is overlapped with the actual landscape viewed through the windshield 200 which is a landscape relating to the future movement.

Figure 7:
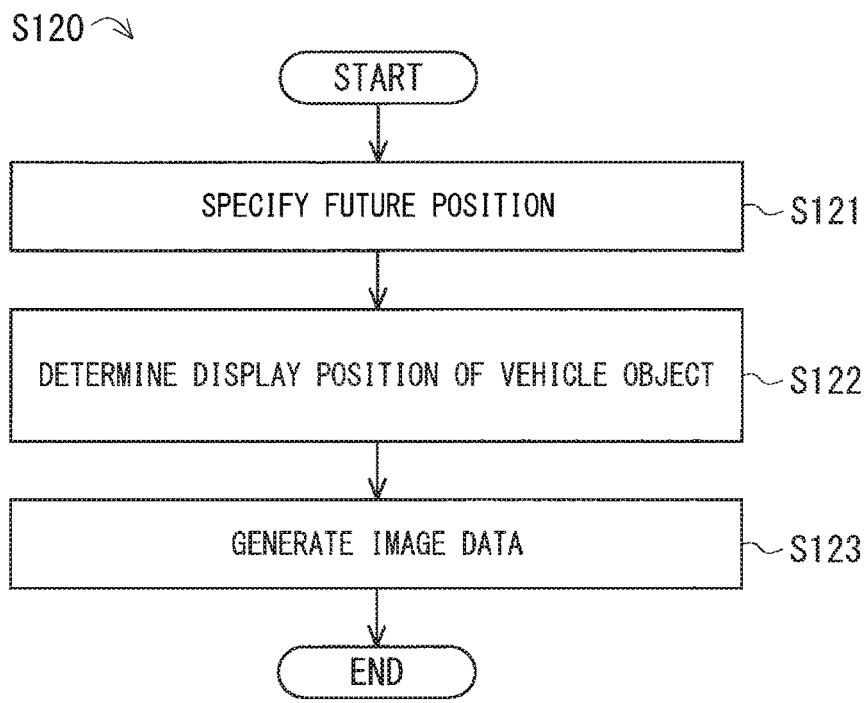
FIG. 7 A flow chart for describing the operation of the controller of the display control apparatus according to the embodiment 1.

FIG. 6 illustrates a block diagram for describing a configuration of the controller 152, and FIG. 7 illustrates a flow chart for describing an operation of the controller 152 (that is to say, Step S120 described above) more specifically. According to FIG. 6, the controller 152 includes a future position specifying unit 1521, a display position determination unit 1522, and an image data generation unit 1523.

According to an operation flow of Step S120 in FIG. 7, the future position specifying unit 1521 specifies the future position of the vehicle 1 in Step S121. For example, the future position specifying unit 1521 assigns a value in a future time to a function expressing the scheduled travel trajectory, thereby acquiring information of the future position of the vehicle 1 at the future time. Particularly, if the short-term scheduled travel trajectory is used, the future position of the vehicle 1 can be specified in a positional relationship with a compartment line. The current time, the future time, and the Td are set to t0, t0+Td, and five seconds, respectively.

In Step S122, the display position determination unit 1522 determines the display position of the vehicle object 210 in the display region defined by the HUD 110, in other words, in the display region of the virtual image.

Figure 8:
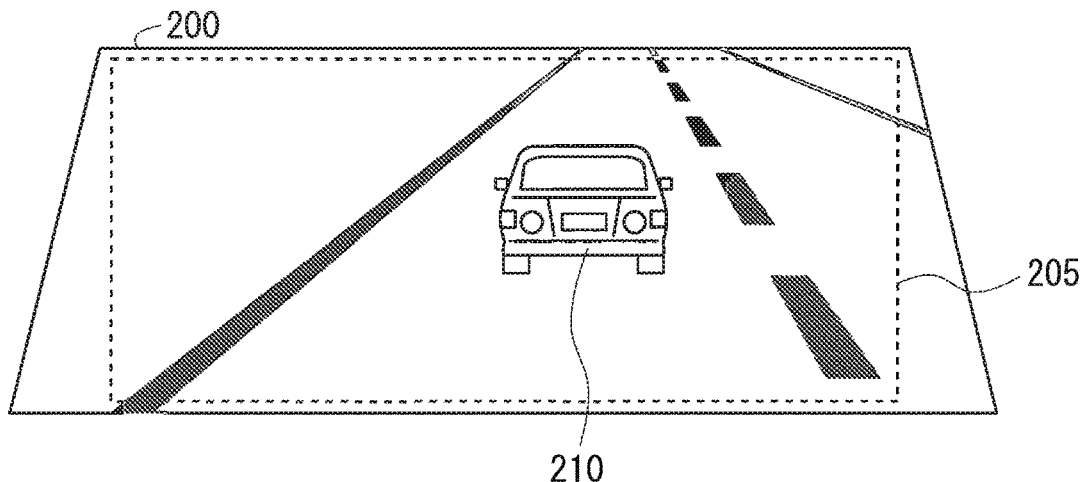
FIG. 8 A diagram for describing a method of determining a display position of the vehicle object in the display control apparatus according to the embodiment 1.

FIG. 8 is referenced herein. A display region 205 defined by the HUD 110 is set in the position shown in FIG. 8 when viewed through the windshield 200. In this case, the position of the display region 205 in a range of the windshield 200 is already known.

The surrounding condition detection device 50 can specify a position of the compartment line in the range of the windshield 200. For example, the surrounding condition detection device 50 takes a landscape with a front camera and performs a compartment line recognition on the captured image, thereby being able to specify the position of the compartment line in the range of the windshield 200.

Accordingly, the position of the compartment line in the range of the display region 205 is specified.

In the meanwhile, the future position specifying unit 1521 can specify the future position of the vehicle 1 in a positional relationship with a compartment line.

Accordingly, the display position of the vehicle object 210 can be determined by reflecting the positional relationship between the future position of the vehicle 1 and the compartment line in the positional relationship between the display position of the vehicle object 210 in the range of the display region 205 and the position of the actual compartment line.

In view of that point, the display position determination unit 1522 determines the display position of the vehicle object 210 in the display region 205 based on information of the positional relationship between the windshield 200 and the display region 205, the position of the compartment line in the range of the windshield 200, and the positional relationship between the future position of the vehicle 1 and the compartment line. Accordingly, the vehicle object 210 can be displayed in the future position in the actual landscape. In the embodiment 1, the display position of the vehicle object 210 is constant in a longitudinal direction of the display region 205.

The information acquisition unit 151 acquires surrounding condition information from the surrounding condition detection device 50, and the display position determination unit 1522 is provided with the surrounding condition information. However, the information acquisition unit 151 may acquire the surrounding condition information, with which the automatic driving control device 30 is provided by the surrounding condition detection device 50, from the automatic driving control device 30.

Going back to FIG. 6 and FIG. 7, the image data generation unit 1523 generates the image data for displaying the vehicle object 210 in the display position determined by the display position determination unit 1522 (the image data corresponding to the whole display region 205) in Step S123. Then, the image data generation unit 1523 outputs the generated image data to the HUD 110.

The display image is updated by repeating the operation flow S120 in FIG. 7 or the operation flow S100 in FIG. 5. As a result, the change in the display position of the vehicle object 210 visually provides the user with the future movement of the vehicle 1.

Since the display control apparatus 150 performs the display control based on the travel control plan, the display control can be performed if the travel control plan is generated. Thus, the display control described above can be executed even not in a complete automatic driving state (a state where the automatic driving control device 30 performs all of the acceleration, the steering, and the braking and the driver does not engage in the driving at all). In other words, the display control described above can be executed regardless of which of the vehicle or the driver has the drive authority.

<Hardware Configuration of Display Control Apparatus 150>

Figure 9:
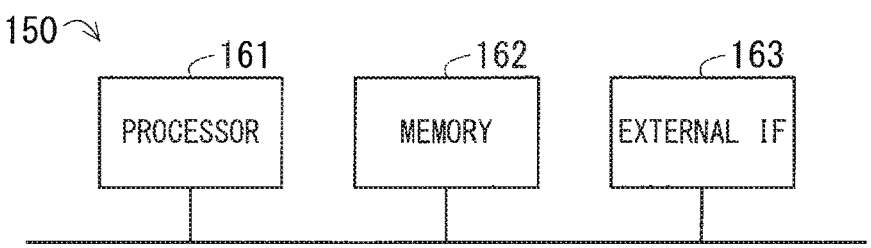
FIG. 9 A hardware configuration diagram of the display control apparatus according to the embodiment 1.

FIG. 9 illustrates a hardware configuration diagram of the display control apparatus 150. According to the example in FIG. 9, the display control apparatus 150 includes a processor 161, a memory 162, and an external interface 163. The interface is referred to as the IF in some cases hereinafter. The processor 161, the memory 162, and the external IF 163 are connected to each other via a bus. However, the connection form is not limited thereto. The processor is also referred to as a microprocessor, a microcomputer, a central processing unit (CPU), an arithmetic device, or a digital signal processor (DSP) in some cases.

Any storage medium such as a semiconductor memory, a magnetic disk, a flexible disk, an optical disk, a compact disk, a minidisk, and a DVD, for example, falls under the memory 162. Any non-volatile or volatile semiconductor memory such as a read only memory (ROM), a random access memory (RAM), a flash memory, an erasable programmable ROM (EPROM), and an electrically erasable programmable ROM (EEPROM), for example, falls under the semiconductor memory described above.

The external IF 163 is an IF circuit for connecting the display control apparatus 150 and an external device, such as a communication circuit. Any external device such as the automatic driving control device 30, the surrounding condition detection device 50, and the HUD 110, for example, falls under the external device. However, if the specification that the display control apparatus 150 and the automatic driving control device 30 can be connected to each other without the external IF 163 is applied, the automatic driving control device 30 is connected to a bus, for example. That is to say, there is also an external device which can be connected to the display control apparatus 150 without the external IF 163 in accordance with a connection specification.

The processor 161 reads out and executes a program stored in the memory 162 (in other words, software, firmware, or a combination of them), thus various functions of the display control apparatus 150 is achieved. For example, the processor 161 executes a program for the controller 152 (more specifically, programs for the future position specifying unit 1521, the display position determination unit 1522, and the image data generation unit 1523), thus a function of the controller 152 (more specifically, functions of the future position specifying unit 1521, the display position determination unit 1522, and the image data generation unit 1523) is achieved. The processor 161 executes a program for the information acquisition unit 151, thus a function of the information acquisition unit 151 is achieved. It the external IF 163 is used, the processor 161 cooperates with the external IF 163, thus a function of the information acquisition unit 151 is achieved.

Figure 10:
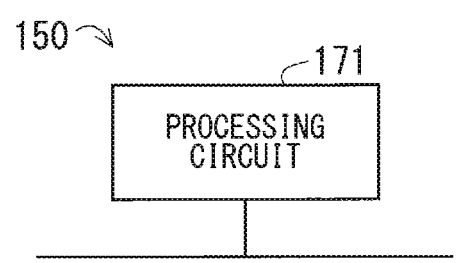
FIG. 10 Another hardware configuration diagram of the display control apparatus according to the embodiment 1.

In the above description, the processor 161 executes the program, thus the function of the display control apparatus 150 is achieved. In contrast, as illustrated in FIG. 10, the function of the display control apparatus 150 can also be achieved by a dedicated processing circuit 171. Any processing circuit such as a single circuit, a combined circuit, a programmed processor, a parallel-programmed processor, an application specific integrated circuit (ASIC), a field programmable gate array (FPGA), and a circuit combining them, for example, falls under the processing circuit 171. The processing circuit 171 may include the external IF 163.

The configurations of FIG. 9 and FIG. 10 may be combined with each other. That is to say, the processor 161 executes a program stored in the memory 162 to achieve some functions of the display control apparatus 150, and the dedicated processing circuit 171 achieves remaining functions of the display control apparatus 150.

Effect

According to the display control apparatus 150, the future movement of the vehicle 1 is visually provided by overlapping the vehicle object 210 which is the display object imitating the vehicle shape with the landscape relating to the future movement. Thus, the future movement of the vehicle 1 can be understood more specifically. As a result, a sense of safety on the future movement of the vehicle 1 can be provided, for example.

Since the future movement of the vehicle 1 is expressed to be easily understood, an unconsidered drive operation of the driver can be avoided, and an occurrence of interrupt processing on the unconsidered drive operation can be avoided. As a result, an increase in a processing load caused by the interrupt processing can be avoided.

The effect is described with an example of a state where the lane change is performed with reference to FIG. 4 again. An operation of a steering wheel at an angle equal to or larger than a predetermined angle or an operation of a directional signal lever is allocated to an operation for requesting the transition of the drive authority from the vehicle to the driver. Assumed in this case is that the driver performs an unconsidered drive operation for the lane change. Then, the automatic driving control device 30 generates the interrupt processing for asking the driver whether or not the operation indicates a drive authority transition request. However, if the future movement of the vehicle 1 is expressed to be easily understood, the driver can appropriately recognize that the planned lane change is executed, thus a motivation for performing the drive operation for the lane change is reduced. Thus, the occurrence of the interrupt processing described above on the unconsidered operation can be avoided. As a result, an increase in a processing load caused by the interrupt processing can be avoided.

The same applies to a case where the operation of the steering wheel at the angle equal to or larger than the predetermined angle or the operation of the directional signal lever is allocated to an operation relating to the other request such as an operation for requesting a complete cancelling of the automatic driving, for example.

As described in an embodiment 4, for example, if a future decrease in speed of the vehicle 1 is expressed to be easily understood, a motivation of the driver to operate a brake pedal is reduced. Thus, the effect similar to that described above is also acquired in a case where a pressing the brake pedal with a pressing amount larger than a predetermined pressing amount is allocated to the operation for the drive authority transition request, for example.

In the embodiment 1, the display position of the vehicle object 210 is constant in the longitudinal direction of the display region 205 (refer to FIG. 4). Thus, the future movement of the vehicle 1 is expressed only by a lateral direction motion component. In contrast, the future movement of the vehicle 1 can also be expressed by both the lateral direction motion component and a front-back direction motion component. However, even when expressed only by the lateral direction motion component, the future movement of the vehicle 1 can be sufficiently understood. A processing amount for determining the display position of the vehicle 1 can be reduced compared with a case of expressing the future movement of the vehicle 1 by both the lateral direction motion component and the front-back direction motion component. An example of expressing the future movement of the vehicle 1 by both the lateral direction motion component and the front-back direction motion component is more specifically described in embodiments 4 and 5.

If the HUD having a specification that a virtual image distance is constant is used as the HUD 110, the display apparatus 100 can be provided at a low cost.

<Determination of Future Position>

A description of the determination of the future position is added herein. As described above, the future position specifying unit 1521 assigns the value in the future time to the function expressing the scheduled travel trajectory, thereby specifying the future position of the vehicle 1 in the future time. At that time, the future time is set to the time t0+Td, after the time interval Td from the current time t0 as a starting point.

The current time t0 as the starting point is, for example, a time ta at a timing of assigning the value in the future time to the function expressing the scheduled travel trajectory.

However, a time after the assigned time ta described above may be defined as the current time t0. For example, a time tb at which the vehicle object 210 is actually displayed is defined as the current time t0. Herein, a processing time taken for the controller 152 and the HUD 110 to perform the various types of processing can be predicted based on a specification, for example. Thus, a value of a time difference Δtab between the times ta and tb can be defined in advance. As a result, the current time t0 can be calculated from t0=ta+Δtab.

In the similar manner, the current time t0 may be a time of executing processing of determining the display position of the vehicle object (Step S122), a time of executing processing of generating the image data (Step S123), or a time of providing the HUD 110 with the image data. Alternatively, an optional time between the times ta and tb described above may be defined as the current time t0.

However, an optional time tc before the assigned time ta described above may also be defined as the current time t0. However, the time tc needs to be defined so that a future time tc+Td in that case is not earlier than the assigned time ta described above. That is to say, tc is defined to satisfy ta<tc+Td, in other words, to >ta−Td.

In the above description, the current time t0 is considered based on the time ta of the timing of when the value in the future time is assigned to the function expressing the scheduled travel trajectory only for convenience of explanation. That is to say, the current time t0 can be defined in a range practically recognized as the current time.

In the processing of specifying the future position described above (Step S121), the starting point for specifying the future point of the vehicle 1 is set to the current time t0. Since the current time t0 and the current position of the vehicle 1 at the current time t0 correspond to each other, the processing of specifying the future position can be understood as processing of specifying the future position of the vehicle 1 based on the current position of the vehicle 1 at the current time t0 as the starting point. In the manner similar to the definition of the current time t0, the current position for specifying the future position can be defined in a range practically recognized as the current position.

The future position of the vehicle 1 may also be defined by a spatial interval Sd instead of the temporal interval Td. That is to say, the future point of the vehicle 1 may be defined as a position which the vehicle 1 is scheduled to reach with the spatial interval Sd from the starting point described above. The spatial interval Sd can be defined as a distance 50 meters ahead or 100 meters ahead in a front direction of the current position or along the scheduled travel trajectory from the current position, for example. FIG. 11 illustrates a display example of the vehicle object 210.

With reference to a time t22 in FIG. 11, for example, if the vehicle 1 is planned to cross the center line at the future position the distance Sd ahead from the current time t22 (in other words, the current position in the current time t22), such a condition is visually provided using the display of the vehicle object 210 at the current time t22. Herein, the future time which is the time of reaching the future position can be estimated on an assumption that the vehicle 1 travels while maintaining the current speed, for example. The future position of the vehicle 1 can be specified by assigning the value of the estimated future time to the function expressing the scheduled travel trajectory.

Embodiment 2

In the embodiment 1, the value of the temporal interval Td defining the difference between the future position and the starting point cannot be changed. In contrast, in the embodiment 2, the user can change the value of the Td.

FIG. 12 illustrates a block diagram for describing a display control apparatus 150B according to the embodiment 2 and an example of application thereof. The display control apparatus 150B has a configuration that an adjustment unit 153B is added to the display control apparatus 150 according to the embodiment 1. The display control apparatus 150B is combined with the display 110 (the HUD 110 herein), thereby being able to constitute a display apparatus 100B. The other configuration in FIG. 12 is similar to that in FIG. 1.

The adjustment unit 153B adjusts the temporal interval Td defining the difference between the future position and the starting point in accordance with an instruction of the user. Specifically, the user inputs a setting value of the Td using the operation device 102. Alternatively, an increase and decrease from the current value of the Td may be input. The instruction of the user is transmitted from the operation device 102 to the adjustment unit 153B. The adjustment unit 153B updates the value of the Td in accordance with the acquired instruction of the user, and provides the controller 152 with the updated value of the Td. Accordingly, the controller 152 operates in the manner similar to the embodiment 1 based on the Td instructed by the user.

In the similar manner, the user can change the spatial interval also in a case where the difference between the future position and the starting point is defined by the spatial interval.

According to the embodiment 2, the effect similar to that in the embodiment 1 can be acquired. According to the embodiment 2, it can be adjusted to what extent the vehicle object 210 expresses regarding the future, thus it is possible to suit user's preference, for example.

Embodiment 3

In the embodiments 1 and 2, only one of the temporal interval Td and the spatial interval Sd is used as the interval defining the difference between the future position and the starting point. In contrast, in the embodiment 3, the temporal interval Td and the spatial interval Sd are dynamically switched in accordance with various conditions.

Figure 13:
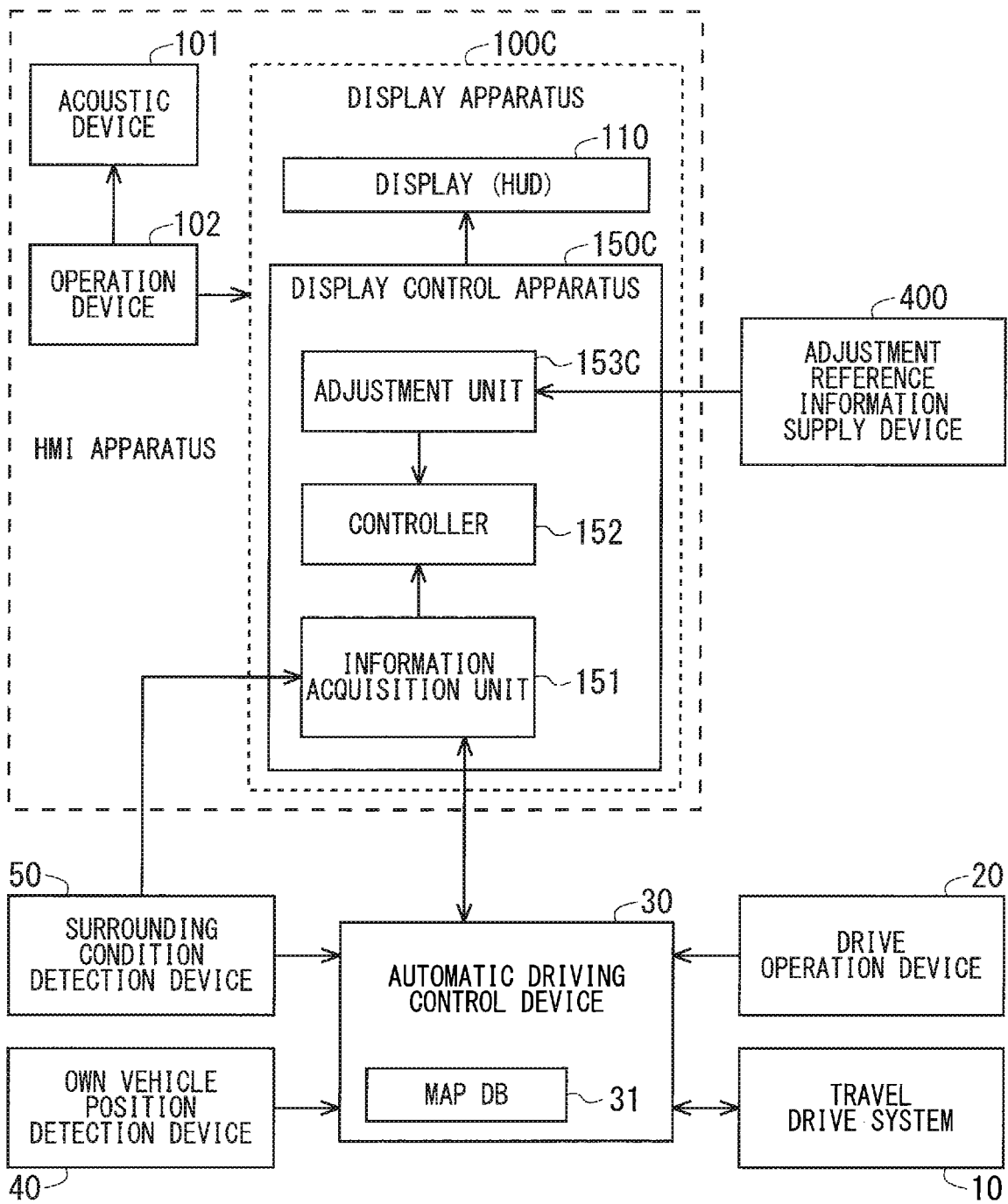
FIG. 13 A block diagram for describing a display control apparatus according to an embodiment 3 and an example of application thereof.

FIG. 13 illustrates a block diagram for describing a display control apparatus 150C according to the embodiment 3 and an example of application thereof. The display control apparatus 150C has a configuration that an adjustment unit 153C is added to the display control apparatus 150 according to the embodiment 1. The display control apparatus 150C is combined with the display 110 (the HUD 110 herein), thereby being able to constitute a display apparatus 100C. According to FIG. 13, an adjustment reference information supply device 400 is added to the configuration in FIG. 1.

The adjustment unit 153C adjusts which to use, the temporal interval Td or the spatial interval Sd, in accordance with a travel condition, for example. Herein, a travel speed of the vehicle 1 is described as an example of the travel condition. Specifically, if the adjustment unit 153C determines that the travel speed is smaller than a speed threshold value for adjusting the interval, the adjustment unit 153C makes the controller 152 use the spatial interval Sd at the time of specifying the future position of the vehicle 1. In contrast, if the adjustment unit 153C determines that the travel speed is equal to or larger than the speed threshold value described above, the adjustment unit 153C makes the controller 152 use the temporal interval Td. The speed threshold value is 20 km/h, for example.

In this case, a speed sensor of the vehicle 1, for example, falls under the adjustment reference information supply device 400, and the speed sensor provides the adjustment unit 153C with information of the travel speed of the vehicle 1 as the adjustment reference information.

The adjustment unit 153C may adjust which to use, the temporal interval Td or the spatial interval Sd, in accordance with a surrounding condition. Herein, a congestion level is described as an example of the surrounding condition. Specifically, if the adjustment unit 153C determines that the congestion level is smaller than a congestion threshold value for adjusting the interval, the adjustment unit 153C makes the controller 152 use the spatial interval Sd at the time of specifying the future position of the vehicle 1. In contrast, if the adjustment unit 153C determines that the congestion level is equal to or larger than the congestion threshold value described above, the adjustment unit 153C makes the controller 152 use the temporal interval Td.

In this case, the surrounding condition detection device 50 falls under the adjustment reference information supply device 400, for example, and the surrounding condition detection device 50 provides the adjustment unit 153C with information of the congestion relating to the scheduled travel trajectory as the adjustment reference information.

The adjustment unit 153C may adjust which to use, the temporal interval Td or the spatial interval Sd, in accordance with a driver condition. Herein, an attention level of the driver is described as an example of the driver condition. The attention level of the driver is determined from a viewpoint of whether the driver feels sleepy, looks at a road, and is calm (in other words, the driver is not excited), for example. If the adjustment unit 153C determines that the attention level of the driver is smaller than an attention level threshold value for adjusting the interval, the adjustment unit 153C makes the controller 152 use the spatial interval Sd at the time of specifying the future position of the vehicle 1. In contrast, if the adjustment unit 153C determines that the attention level is equal to or larger than the attention level threshold value described above, the adjustment unit 153C makes the controller 152 use the temporal interval Td.

In this case, a driver information detection device falls under the adjustment reference information supply device 400, and the driver information detection device provides the adjustment unit 153C with information of the attention level of the driver as the adjustment reference information. The driver information detection device has an in-vehicle camera for taking an image of the driver as a sensor, for example, to detect a movement of eyes and a face of the driver by analyzing an image captured with the camera and determine the attention level of the driver from a direction of a visual line and a direction of the face of the driver. The sensor of the driver information detection device needs to detect a behavior of the driver. Thus, the other sensor may be used. Examples of the other sensor include a sound collecting microphone acquiring a voice of the driver, a biosensor provided on the steering wheel, and a brain wave sensor, for example.

The adjustment unit 153C may determine which to use, the temporal interval Td or the spatial interval Sd, based on at least two of the travel condition, the surrounding condition, and the driver condition.

According to the embodiment 3, the effect similar to that in the embodiment 1 can be acquired.

The adjustment unit 153C may have a function of the adjustment unit 153B according to the embodiment 2, that is to say, a function of adjusting the temporal interval Td and the spatial interval Sd in accordance with the instruction of the user.

The value of the Td or Sd may be changed instead of or in addition to the selective use of the temporal interval Td and the spatial interval Sd described above. That is to say, in the present embodiment 1, the future position of the vehicle 1 is fixedly set to after five seconds or 100 meters ahead, in other words, the Td or Sd has the constant value. In the meanwhile, the adjustment unit 153C may change the value of the Td or Sd based on one or at least two of the travel condition, the surrounding condition, and the driver condition.

For example, the value of the Td or Sd may be set to be larger as the speed of the vehicle 1 increases. According to this, a change in the movement of the vehicle 1 can be displayed earlier as the speed increases.

If there are many other vehicles around the vehicle 1, for example, the value of the Td or Sd may be set to be smaller. If there is a preceding vehicle 50 meters ahead, for example, the value of the Td or Sd may be reduced. According to them, a near future is displayed rather than a far future, thus a confusion caused by the surrounding vehicle is reduced.

If the decrease in the attention level of the driver is detected, the value of the Td or Sd may be set to be larger. According to this, a change in the movement of the vehicle 1 can be displayed earlier, thus a recognition time of the driver can be ensured.

Embodiment 4

In the embodiment 1, the display of the vehicle object 210 is controlled so that the future movement of the vehicle 1 is expressed only by the lateral direction motion component. In contrast, in the embodiment 4, the display of the vehicle object 210 is controlled so that the future movement of the vehicle 1 is expressed by both the lateral direction motion component and the front-back direction motion component.

Figure 14:
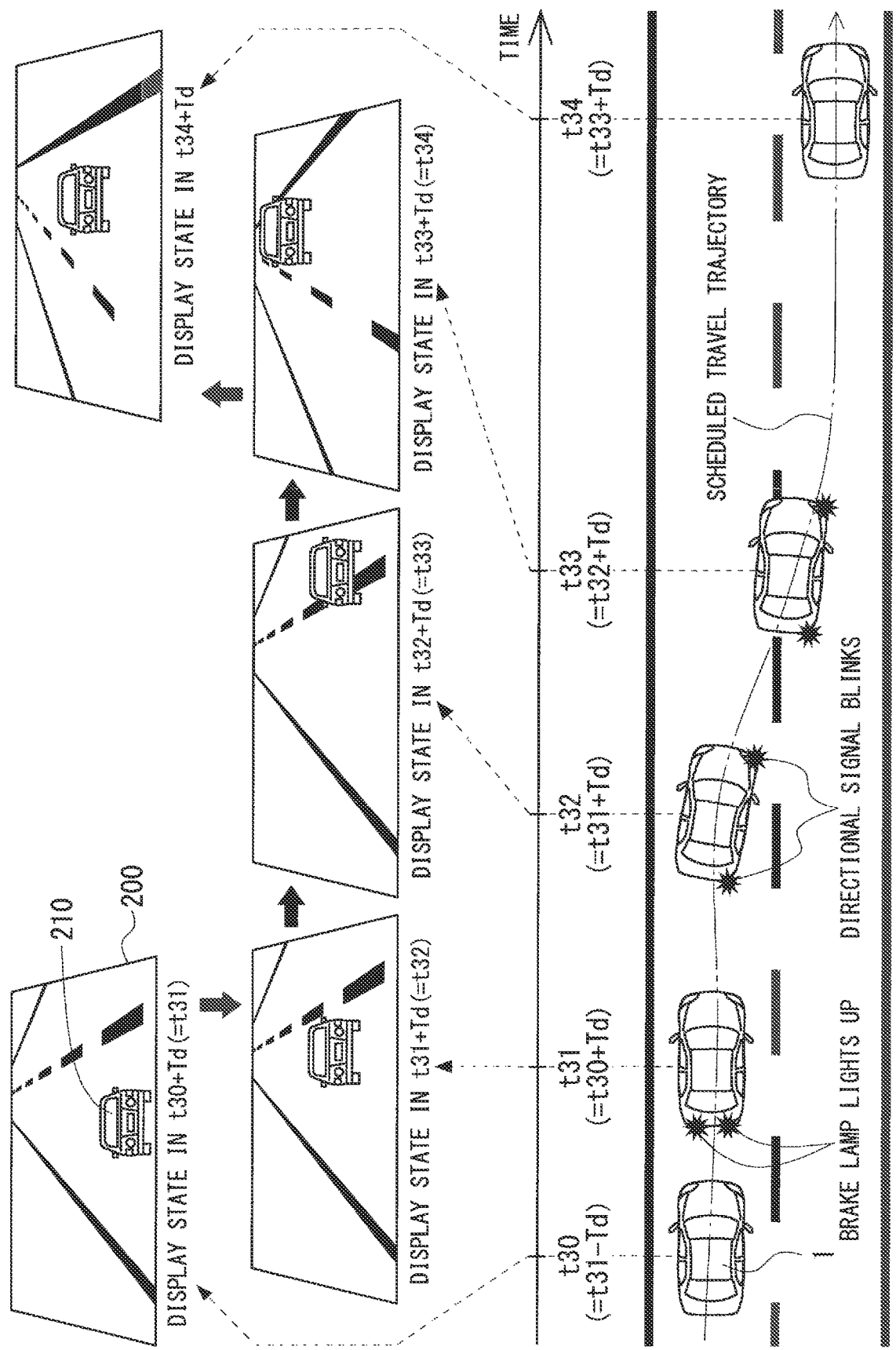
FIG. 14 A diagram for describing a display according to an embodiment 4.

FIG. 14 illustrates an example. FIG. 14 illustrates the vehicle 1 changing the traffic lane to avoid an obstacle (not shown), for example, as shown in a lower side of FIG. 14. FIG. 14 illustrates the actual landscape viewed through the windshield 200 and the vehicle object 210 displayed by the HUD 110 in an upper side of FIG. 14. A scale including t30 to t34 in a time axis shown in a middle side of FIG. 14 is illustrated to correspond to a position of the vehicle 1 in the lower side of FIG. 14. Thus, a length of Td (a length from t30 to t31, from t31 to t32, from t32 to t33, and from t33 to t34 fall under the length of the Td) in the time axis is not equally illustrated in some cases.

According to the travel control plan in FIG. 14, the vehicle 1 traveling in the left lane temporarily reduces the speed at the time t31. Subsequently, the vehicle 1 increases the speed and starts the lane change. At the time t32, the vehicle 1 travels in a position closer to the center line. Then, the vehicle 1 crosses the center line at the time t33, and subsequently increases the speed while entering the right lane. The speed of the vehicle 1 reaches a target speed at the time t34, and the target speed is subsequently maintained.

Firstly, FIG. 14 and FIG. 4 have in common that the scheduled travel trajectory has the lane change, thus a lateral direction position component (also referred to as a lateral direction position in some cases hereinafter) of the display position of the vehicle object 210 in FIG. 14 can be set in the manner similar to that in FIG. 4. Thus, a longitudinal direction position component (also referred to as a longitudinal direction position in some cases hereinafter) of the display position of the vehicle object 210 is described hereinafter.

With reference to FIG. 14, when the current time is t30, the vehicle object 210 is displayed in the future position in the future time t31 (=t30+Td). Since the vehicle 1 reduces the speed at the time t31 as described above, the future position in the future time t31 approximates the current position in the current time t30 compared with the case of maintaining the speed of the vehicle 1. In order to indicate such a condition, the longitudinal direction position of the vehicle object 210 is set to be closer to a lower side of the windshield 200 (in other words, a lower side of the display region 205).

When the current time is t31, the vehicle object 210 is displayed in the future position in the future time t32 (=t31+Td). Since the vehicle 1 increases the speed after the time t31 as described above, the longitudinal direction position of the vehicle object 210 is set to be farther away from the lower side of the windshield 200 compared with the display position in the time t31.

When the current time is t32, the vehicle object 210 is displayed in the future position in the future time t33 (=t32+Td). The speed of the vehicle 1 is constant from the time t32 to the time t33, thus the longitudinal direction position of the vehicle object 210 is the same in the times t32 and t33.

When the current time is t33, the vehicle object 210 is displayed in the future position in the future time t34 (=t33+Td). Since the vehicle 1 increases the speed after entering the right lane as described above, the future position in the future time t34 is farther away from the current position in the current time t33 compared with the case of maintaining the speed of the vehicle 1. In order to indicate such a condition, the longitudinal direction position of the vehicle object 210 is set to be closer to an upper side of the windshield 200 (in other words, an upper side of the display region 205).

When the current time is t34, the vehicle object 210 is displayed in a future position in a future time t34+Td. Since the vehicle 1 maintains the constant speed after the time t34 as described above, the future position in the future time t34+Td approximates the current position in the current time t34 compared with the case of increasing the speed from the time t33 to the time t34. Thus, the longitudinal direction position of the vehicle object 210 is set to be farther away from the upper side of the windshield 200 compared with the display position in the time t33.

The vehicle object 210 is also displayed in the similar manner in a state of turning right and left, for example.

As described above, in the embodiment 4, the longitudinal direction position of the vehicle object 210 is controlled, thus a sense of perspective of the future position can be expressed.

Figure 15:
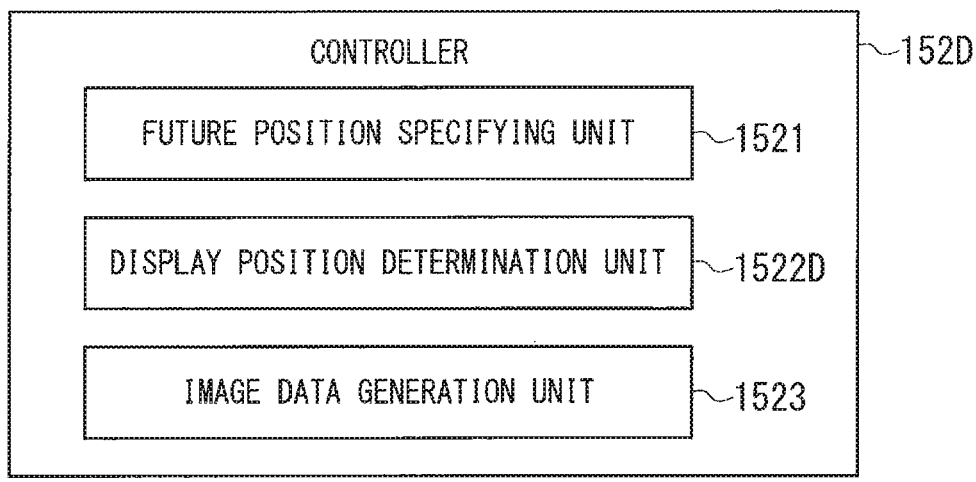
FIG. 15 A block diagram for describing a configuration of a controller of a display control apparatus according to the embodiment 4.
Figure 16:
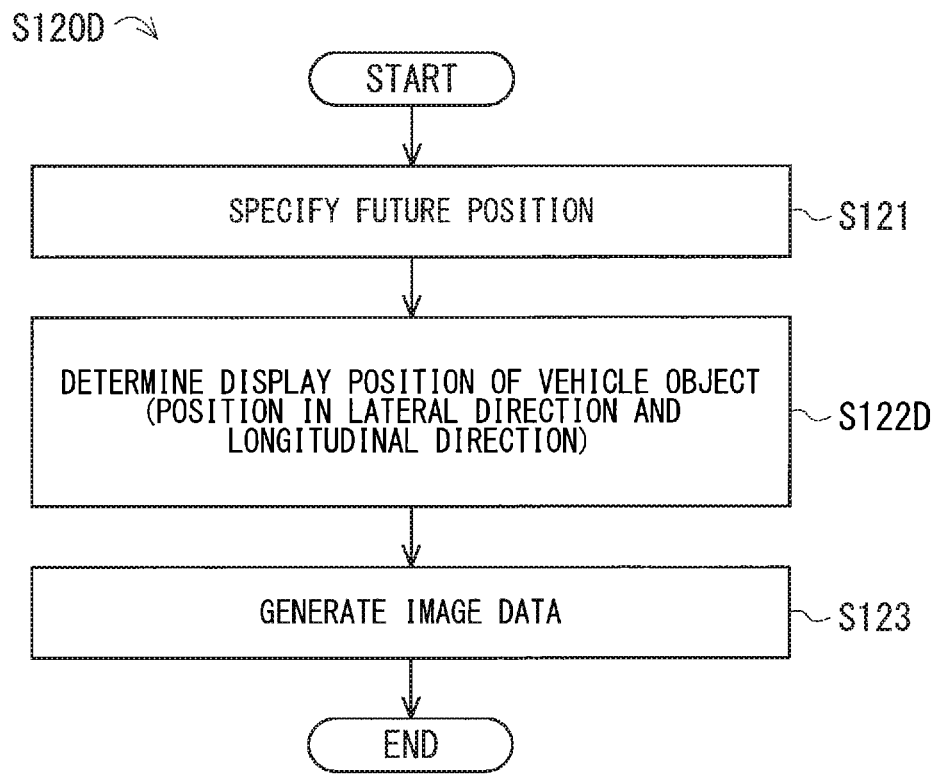
FIG. 16 A flow chart for describing an operation of the controller of the display control apparatus according to the embodiment 4.

FIG. 15 illustrates a block diagram of a controller 152D according to the embodiment 4, and FIG. 16 illustrates a flow chart on an operation of the controller 152D. The controller 152D is applied to the display control apparatus instead of the controller 152 which is described already. The controller 152D includes the future position specifying unit 1521, a display position determination unit 1522D, and an image data generation unit 1523.

According to an operation flow S120D in FIG. 16, the future position specifying unit 1521 specifies the future position of the vehicle 1 in Step S121 in the manner similar to the embodiment 1.

Next, in Step S122D, the display position determination unit 1522D determines the display position of the vehicle object 210 in the display region 205 defined by the HUD 110. Particularly, the display position determination unit 1522D according to the embodiment 4 determines the lateral direction position and the longitudinal direction position of the vehicle object 210.

Particularly, the display position determination unit 1522D determines the lateral direction position of the vehicle object 210 in the manner similar to Step S122 described in the embodiment 1.

The display position determination unit 1522D determines the longitudinal direction position of the vehicle object 210 in accordance with a distance from the future position and the current position of the vehicle 1. Specifically, the display position determination unit 1522D sets the longitudinal direction position of the vehicle object 210 closer to the lower side of the display region 205 as the future position is closer to the current position. In other words, the display position determination unit 1522D sets the longitudinal direction position of the vehicle object 210 closer to the upper side of the display region 205 as the future position is farther away from the current position.

Herein, the display position determination unit 1522D can acquire information of the current position of the vehicle 1 from the scheduled travel trajectory. Alternatively, the display position determination unit 1522D may acquire the information of the current position directly from the own vehicle position detection device 40 or via the automatic driving control device 30.

Subsequently, in Step S123, the image data generation unit 1523 generates the image data for displaying the vehicle object 210 in the display position determined by the display position determination unit 1522D. Then, the image data generation unit 1523 outputs the generated image data to the HUD 110.

According to the embodiment 4, the effect similar to that in the embodiment 1 can be acquired. According to the embodiment 4, the future movement of the vehicle 1 can be expressed more specifically.

Embodiment 5

Figure 17:
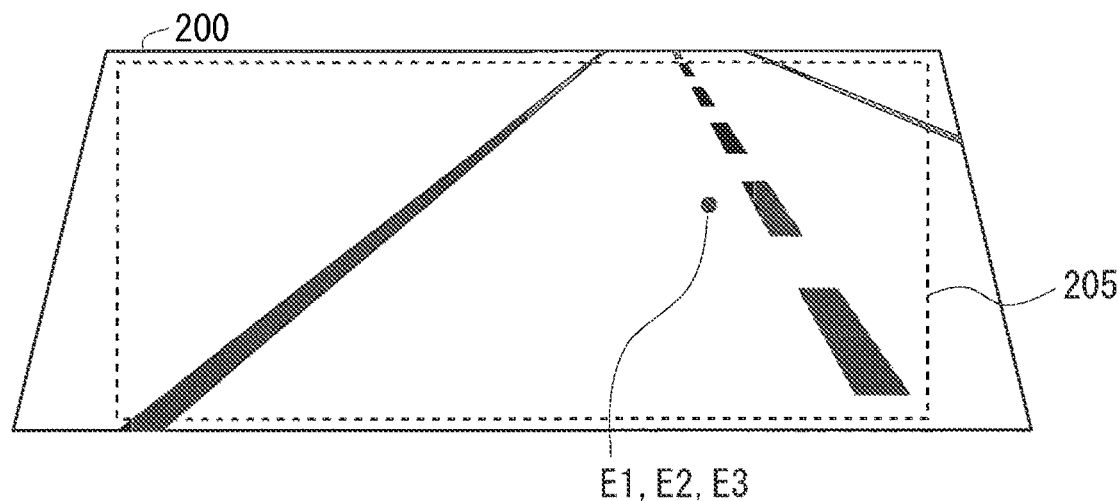
FIG. 17 A diagram for describing a method of determining a display position of a vehicle object in a display control apparatus according to the embodiment 5.

In the embodiment 5, the lateral direction position and the longitudinal direction position of the vehicle object 210 are determined by a method different from that in the embodiment 4. The method according to the embodiment 5 is described with reference to FIG. 17.

The future position of the vehicle 1 is specified as a position E1 in the actual landscape, for example. When the actual landscape is taken with the front camera of the vehicle 1, the position E1 in the actual landscape corresponds to a position E2 in the captured image. Generally, a correspondence relationship between information of the position E1 in the actual landscape and information of the position. E2 in the captured image can be defined based on a shooting direction and a shooting range, for example. In the similar manner, a correspondence relationship between the shooting range and the range of the windshield 200 can be defined. The position of the display region 205 defined by the HUD 110 in the range of the windshield 200 is already known. Then, the information of the position E1 in the actual landscape, that is to say, the information of the future position of the vehicle 1 can be converted into information of a position E3 in the display region 205 defined by the HUD 110. Accordingly, the display position of the vehicle object 210, that is to say, the lateral direction position and the longitudinal direction position the vehicle object 210 can be determined from the future position of the vehicle 1.

Figure 18:
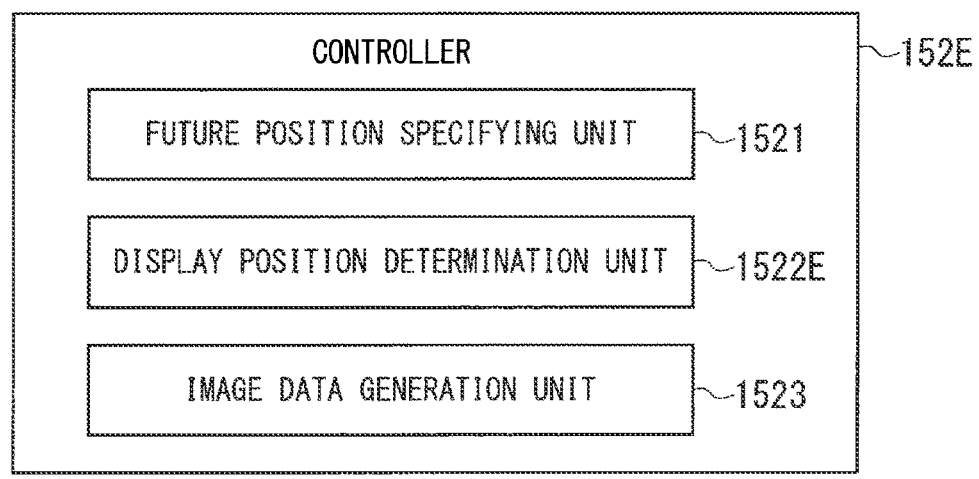
FIG. 18 A block diagram for describing a configuration of a controller of the display control apparatus according to the embodiment 5.
Figure 19:
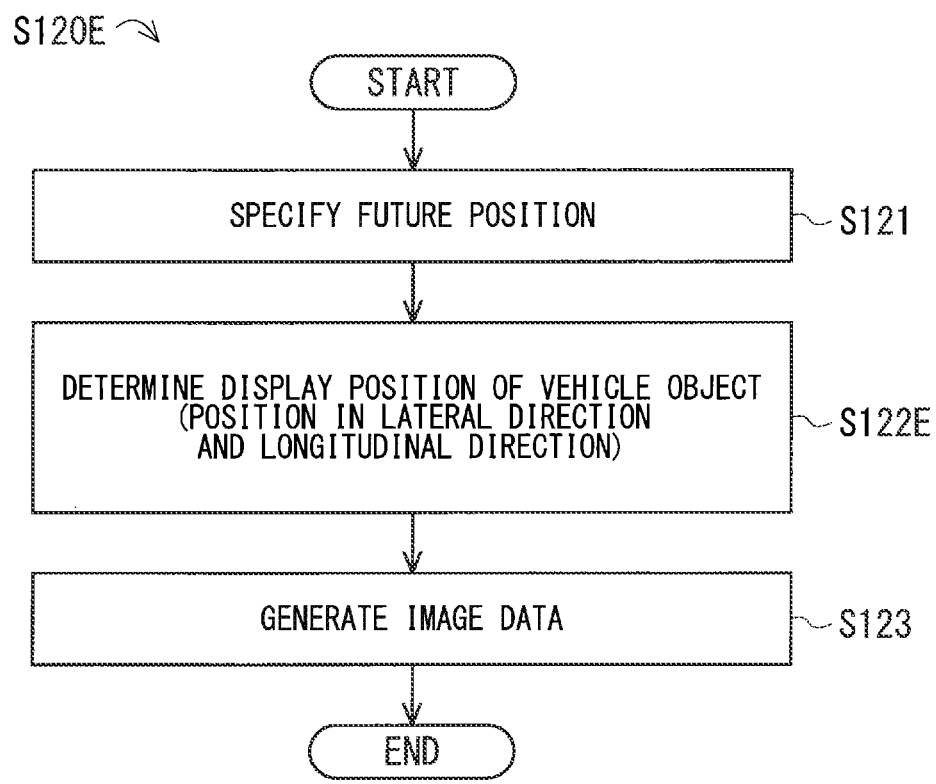
FIG. 19 A flow chart for describing an operation of the controller of the display control apparatus according to the embodiment 5.

FIG. 18 illustrates a block diagram of a controller 152E according to the embodiment 5, and FIG. 19 illustrates a flow chart on an operation of the controller 152E. The controller 152E is applied to the display control apparatus instead of the controller 152 which is described already. The controller 152E includes the future position specifying unit 1521, a display position determination unit 1522E, and an image data generation unit 1523.

According to an operation flow S120E in FIG. 19, the future position specifying unit 1521 specifies the future position of the vehicle 1 in Step S121 in the manner similar to the embodiment 1.

Next, in Step S122E, the display position determination unit 1522E determines the display position of the vehicle object 210 in the display region 205 defined by the HUD 110. In view of the description described above, the correspondence between the future position and the display position of the vehicle object 210 can be provided by a function having the information of the future position and the information of the shooting condition of the front camera as a variable, for example. According to this, the display position determination unit 1522E assigns the information of the future position, for example, to the function, thereby determining the display position of the vehicle object 210, that is to say, the lateral direction position and the longitudinal direction position of the vehicle object 210.

Subsequently, in Step S123, the image data generation unit 1523 generates the image data for displaying the vehicle object 210 in the display position determined by the display position determination unit 1522E. Then, the image data generation unit 1523 outputs the generated image data to the HUD 110.

According to the embodiment 5, the effect similar to that in the embodiment 1 can be acquired. According to the embodiment 5, the future movement of the vehicle 1 can be expressed more specifically.

Embodiment 6

Figure 20:
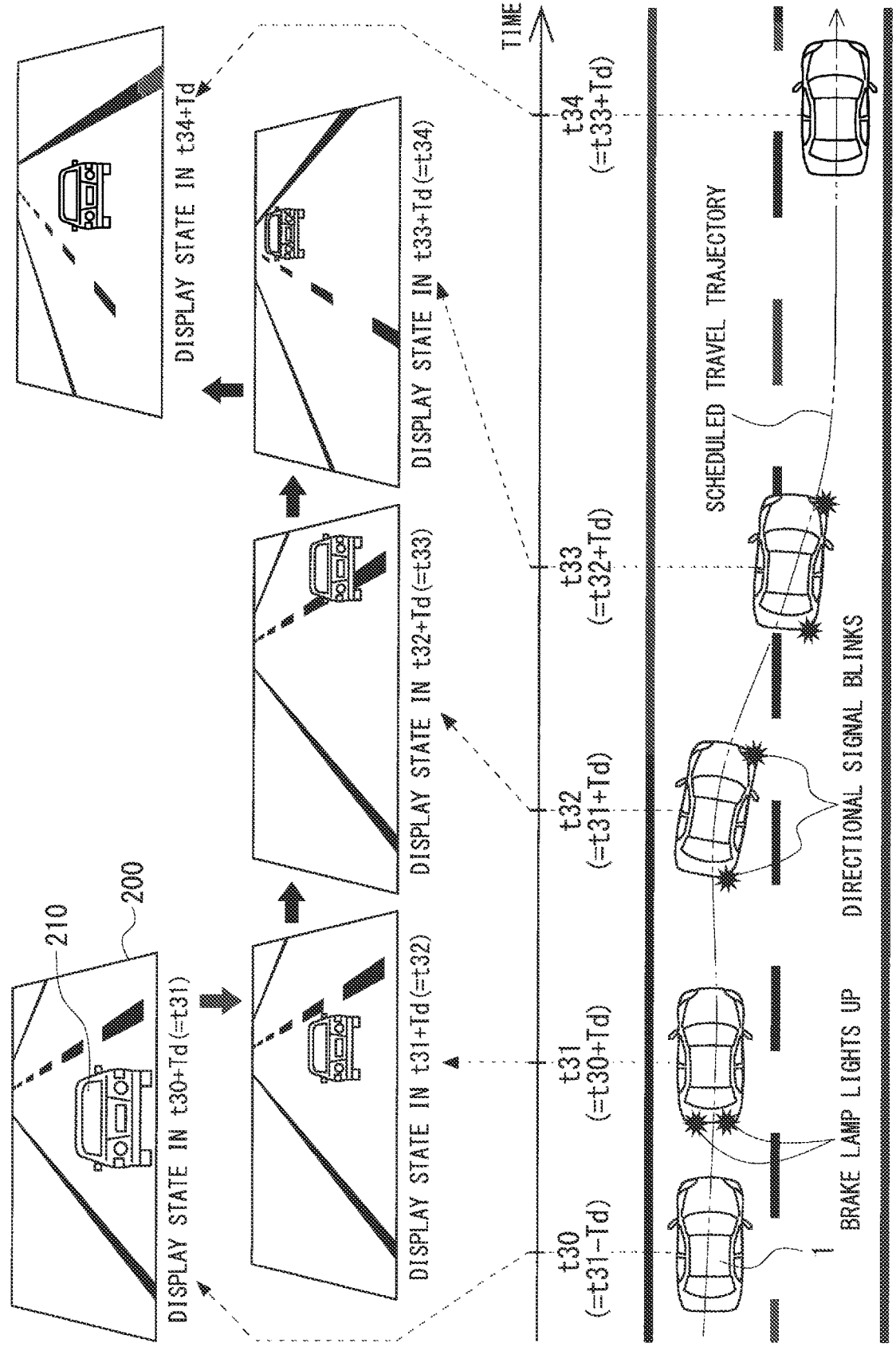
FIG. 20 A diagram for describing a display according to an embodiment 6.

In the embodiment 6, a display form of the vehicle object 210 is changed in accordance with the future movement of the vehicle 1. Specifically, a display size of the vehicle object 210 is controlled in accordance with the difference between the current position and the future position of the vehicle 1. FIG. 20 illustrates an example. As will be appreciated from the comparison of FIG. 20 with FIG. 14 which is described already, in the embodiment 6, the vehicle object 210 is displayed with a larger size as the distance from future position to the current position decreases (see the display in the current time t30), and in contrast, the vehicle object 210 is displayed with a smaller size as the distance from the future position to the current position increases (see the display in the current time t33). Thus, a sense of perspective of the future position can be expressed.

Figure 21:
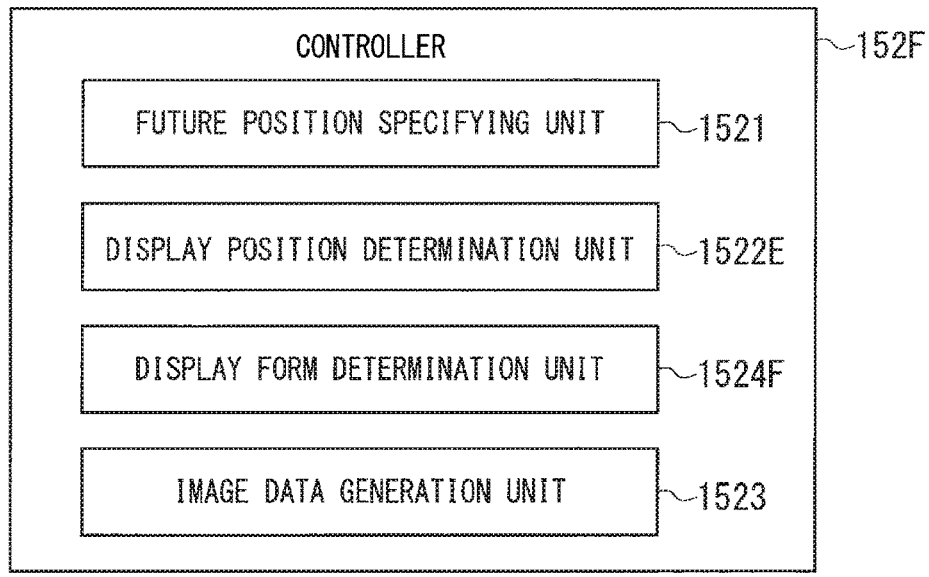
FIG. 21 A block diagram for describing a configuration of a controller of a display control apparatus according to the embodiment 6.
Figure 22:
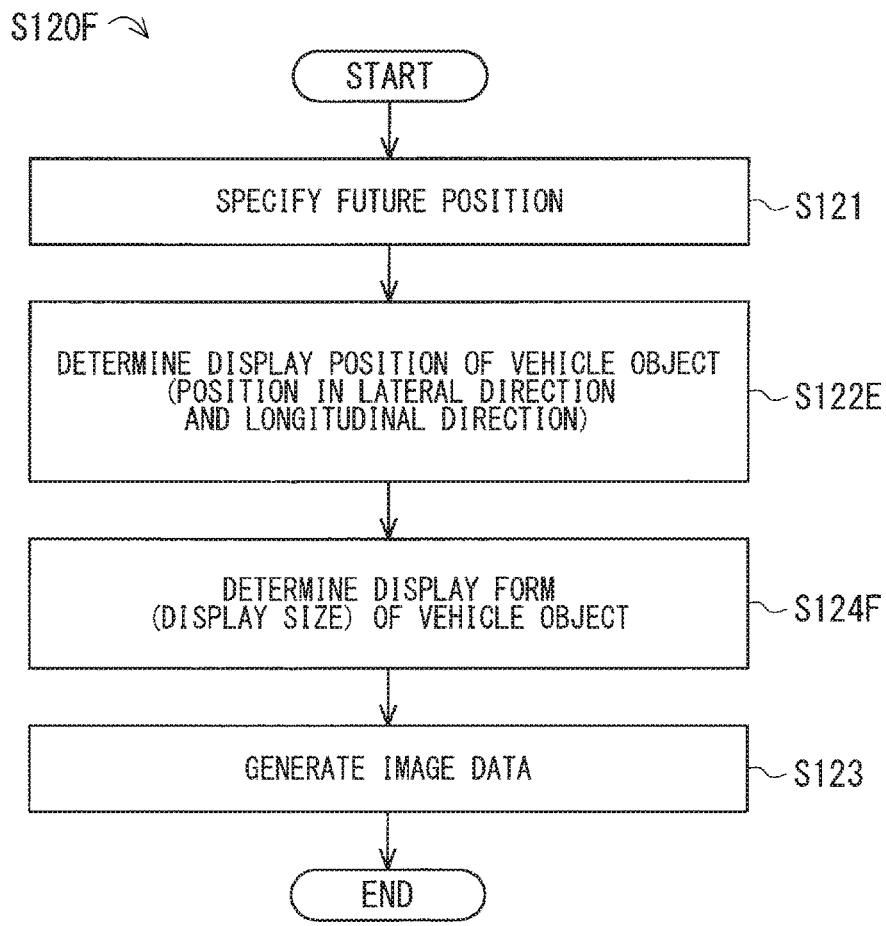
FIG. 22 A flow chart for describing an operation of the controller of the display control apparatus according to the embodiment 6.

FIG. 21 illustrates a block diagram of a controller 152F according to the embodiment 6, and FIG. 22 illustrates a flow chart on an operation of the controller 152F. The controller 152F is applied to the display control apparatus instead of the controller 152 which is described already. The controller 152F has a configuration that a display form determination unit 1524F is added to the controller 152E according to the embodiment 5.

According to an operation flow S120F in FIG. 22, the future position specifying unit 1521 specifies the future position of the vehicle 1 in Step S121 in the manner similar to the embodiment 1. Next, in Step S122E, the display position determination unit 1522E determines the display position of the vehicle object 210 in the manner similar to the embodiment 5.

Next, in Step S124F, the display form determination unit 1524F determines the display size of the vehicle object 210 in accordance with the longitudinal direction position determined in Step S122E described above. Specifically, the display form determination unit 1524F sets the display size of the vehicle object to be smaller as the distance from the longitudinal direction position to the upper side of the display region 205 decreases (that is to say, as the distance from the future position to the current position increases). In other words, the display form determination unit 1524F sets the display size of the vehicle object to be larger as the distance from the longitudinal direction position to the lower side of the display region decreases (that is to say, as the distance from the future position to the current position decreases).

Subsequently, in Step S123, the image data generation unit 1523 generates the image data for displaying the vehicle object 210 with the display size determined by the display form determination unit 1524F in the display position determined by the display position determination unit 1522E. Then, the image data generation unit 1523 outputs the generated image data to the HUD 110.

According to the embodiment 6, the effect similar to that in the embodiment 1 can be acquired. According to the embodiment 6, the future movement of the vehicle 1 can be expressed more specifically.

Although in the embodiment 6, the function of the display form determination unit 1524F is applied to the embodiment 5, the function of the display form determination unit 1524F can also be applied to the other embodiment.

Embodiment 7

Described in the embodiment 7 is a case of using an HUD having a specification that the virtual image distance can be changed as the HUD 110. Specifically, as the distance from the future position to the current position of the vehicle 1 increases, the virtual image distance is increased, and in contrast, as the distance from the future position to the current position decreases, the virtual image distance is reduced. Thus, a sense of perspective of the future position can is expressed.

Figure 23:
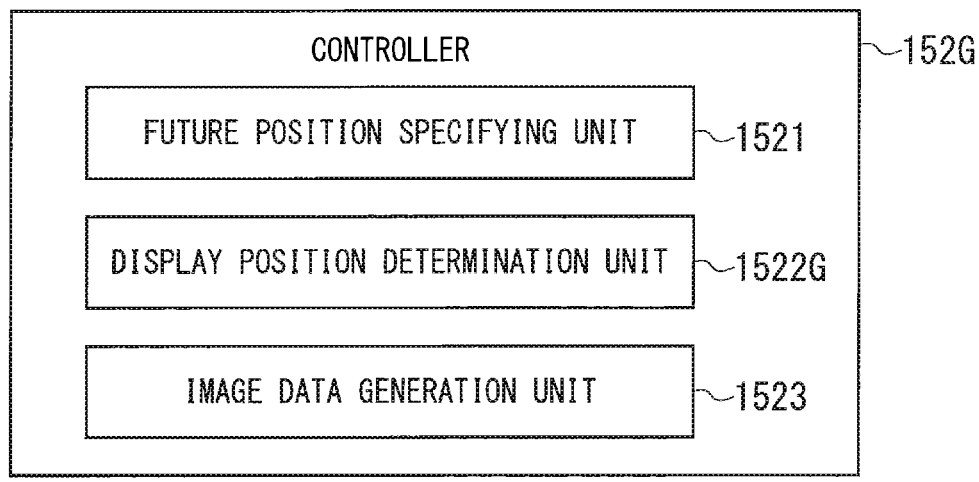
FIG. 23 A block diagram for describing a configuration of a controller of a display control apparatus according to an embodiment 7.
Figure 24:
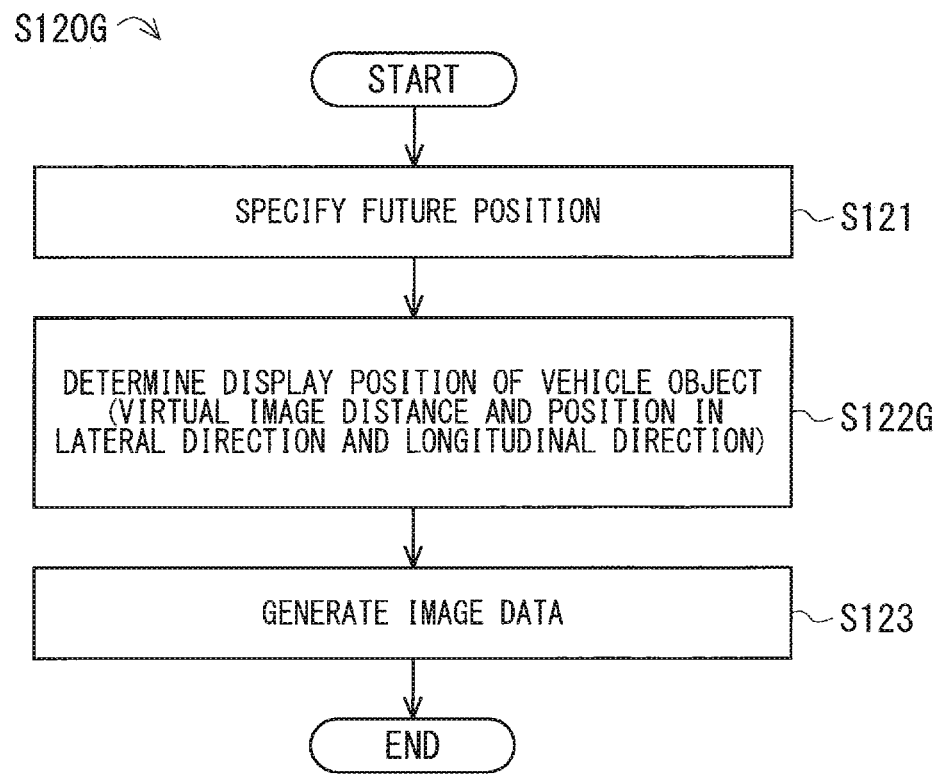
FIG. 24 A flow chart for describing an operation of the controller of the display control apparatus according to the embodiment 7.

FIG. 23 illustrates a block diagram of a controller 152G according to the embodiment 7, and FIG. 24 illustrates a flow chart on an operation of the controller 152G. The controller 152G is applied to the display control apparatus instead of the controller 152 which is described already. The controller 152G includes the future position specifying unit 1521, a display position determination unit 1522G, and the image data generation unit 1523.

According to an operation flow S120G in FIG. 24, the future position specifying unit 1521 specifies the future position of the vehicle 1 in Step S121 in the manner similar to the embodiment 1.

Next, in Step S122G, the display position determination unit 1522G determines the display position of the vehicle object 210 in the display region 205 defined by the HUD 110. Specifically, the display position determination unit 1522G determines the virtual image distance in accordance with a distance from the future position to the current position of the vehicle 1. That is to say, the virtual image distance is set to be larger as the distance from the future position to the current position increases as described above. Then, the display position determination unit 1522G determines the display position of the vehicle object 210 in the display region defined in relation to the virtual image distance which has been set, in the manner similar to the embodiment 5.

Subsequently, in Step S123, the image data generation unit 1523 generates the image data for displaying the vehicle object 210 in the display position (that is to say, the virtual image distance, the longitudinal direction position, and the lateral direction position) determined by the display position determination unit 1522G. Then, the image data generation unit 1523 outputs the generated image data to the HUD 110.

According to the embodiment 7, the effect similar to that in the embodiment 1 can be acquired. According to the embodiment 7, the future movement of the vehicle 1 can be expressed more specifically. Since the size of the vehicle object 210 appears to be different in accordance with the virtual image distance, a sense of perspective can be expressed even if the display size of the vehicle object 210 is not controlled as the embodiment 6.

Although in the embodiment 7, the function of the display position determination unit 1522G is applied to the embodiment 5, the function of the display position determination unit 1522G can also be applied to the other embodiment.

Embodiment 8

In the embodiment 8, a display form of the vehicle object 210 is changed in accordance with the future movement of the vehicle 1. FIG. 25 illustrates a block diagram of a controller 152H according to the embodiment 8. The controller 152H is applied to the display control apparatus instead of the controller 152 which is described already. The controller 152H has a configuration that a display form determination unit 1524H is added to the controller 152E according to the embodiment 5.

Figure 26:
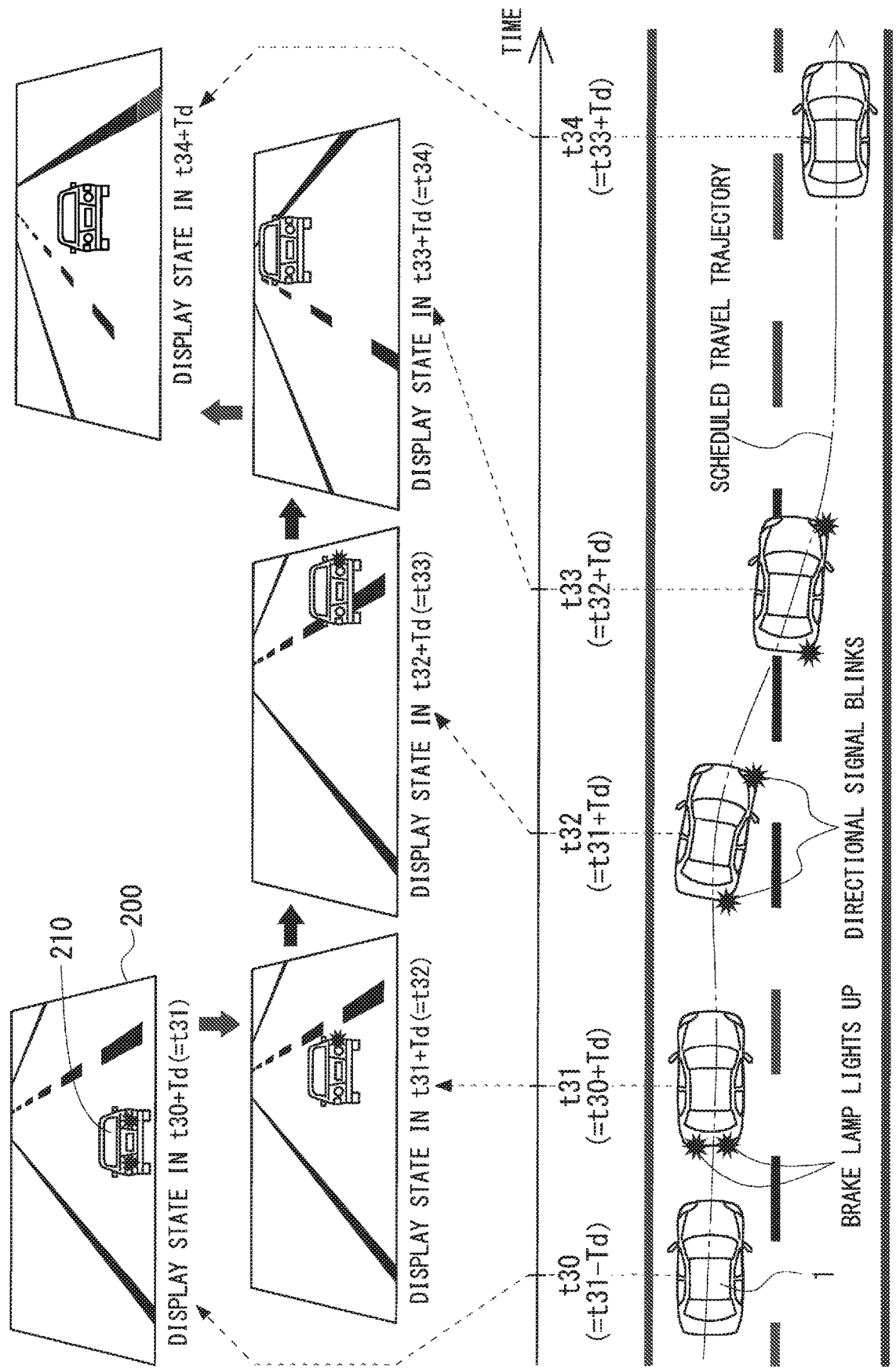
FIG. 26 A diagram for describing a display according to an embodiment 8.

If a lighting or blinking of a vehicle exterior lamp is planned in the travel control plan, the display form determination unit 1524H sets the display form of the vehicle object 210 so that a part of the vehicle object 210 corresponding to the vehicle exterior lamp appears to light up or blink. FIG. 26 illustrates an example. The vehicle 1 in FIG. 26 travels in the manner similar to that in FIG. 14.

According to FIG. 26, the vehicle 1 is planned to turn on a brake lamp which is the vehicle exterior lamp with the decrease in speed at the time t31. Thus, with regard to the display in the current time t30 (=t31−Td), the display form determination unit 1524H applies the display form, in which the part of the vehicle object 210 corresponding to the brake lamp appears to light up, to the vehicle object 210.

Figure 27:
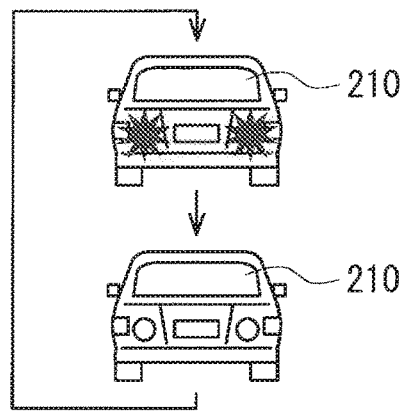
FIG. 27 A diagram for describing a display according to the embodiment 8.
Figure 28:
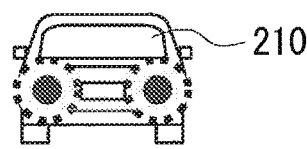
FIG. 28 A diagram for describing a display according to the embodiment 8.

Herein, if a braking longer than a set length (three seconds, for example) is planned, the display form determination unit 1524H sets the part of the vehicle object 210 corresponding to the brake lamp to the display form for transmitting a notification of a pumping brake. The display form for transmitting the notification of the pumping brake is an animation display in which the part corresponding to the brake lamp appears to be turned on and off repeatedly as illustrated in FIG. 27, for example. Alternatively, as illustrated in FIG. 28, the other display form for the pumping brake may also be used.

Figure 29:
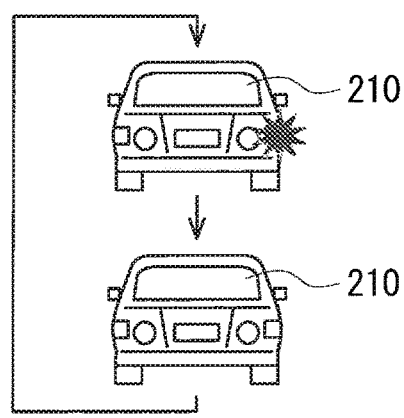
FIG. 29 A diagram for describing a display according to the embodiment 8.

Going back to FIG. 26, the vehicle 1 is planned to blink a directional signal lamp which is the vehicle exterior lamp in accordance with the lane change at the times t32 and t33. Thus, with regard to the display in the current times t31 (=t32−Td) and t32 (=t33−Td), the display form determination unit 1524H applies the display form, in which the part of the vehicle object 210 corresponding to the directional signal lamp appears to blink (see FIG. 29), to the vehicle object 210. This display form is also applied to the blinking of directional signal lamps at the time of turning right and left.

The directional signal lamps are also generally used as hazard lamps. For example, if the vehicle 1 is planned to stop at a roadside strip and blink the hazard lamps at that time (specifically, simultaneously blink the left and right directional signal lamps), the display form determination unit 1524H applies the display form, in which parts of the vehicle object 210 corresponding to the left and right directional signal lamps appear to blink, to the vehicle object 210.

Figure 30:
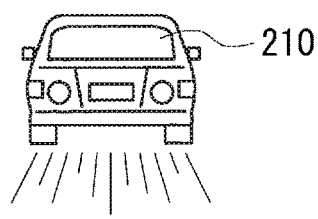
FIG. 30 A diagram for describing a display according to the embodiment 8.
Figure 31:
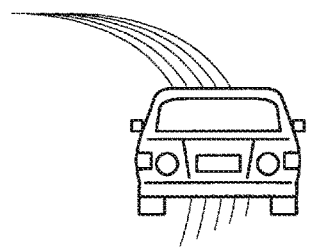
FIG. 31 A diagram for describing a display according to the embodiment 8.
Figure 32:
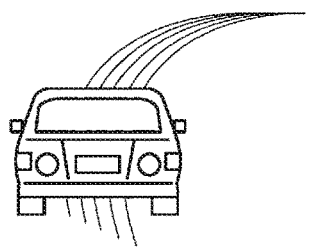
FIG. 32 A diagram for describing a display according to the embodiment 8.

The display form determination unit 1524H sets the vehicle object 210 to have the display form with an effect line corresponding to the future movement. For example, if the vehicle 1 increases the speed in the future time, the display form illustrated in FIG. 30 is applied to the display in the current time. FIG. 31 and FIG. 32 illustrate an effect line indicating left turn and right turn, respectively. The effect line may be displayed in an animation form.

Only the part of these examples of the display form may be adopted, or the other display form may also be adopted.

Figure 33:
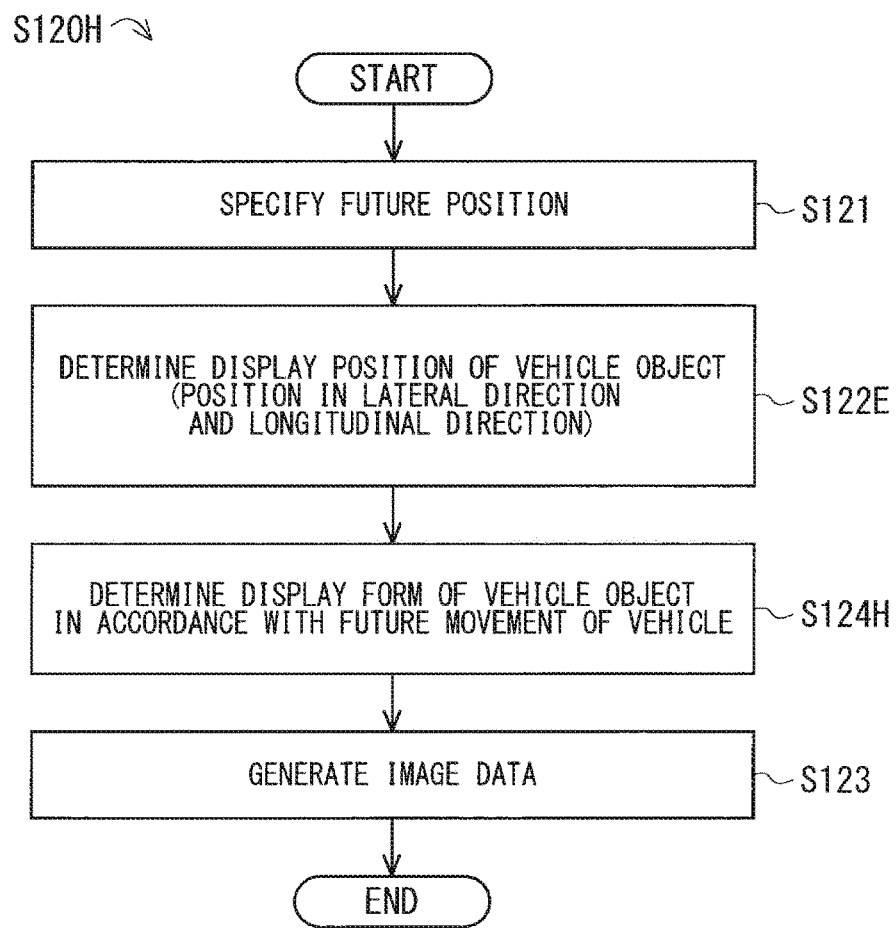
FIG. 33 A flow chart for describing an operation of the controller of the display control apparatus according to the embodiment 8.

FIG. 33 illustrates a flow chart on an operation of the controller 152H. According to an operation flow S120H in FIG. 33, the future position specifying unit 152I specifies the future position of the vehicle 1 in Step S121 in the manner similar to the embodiment 1. Next, in Step S122E, the display position determination unit 1522E determines the display position of the vehicle object 210 in Step S122E in the manner similar to the embodiment 5.

Next, in Step S124H, the display form determination unit 1524H determines the display form of the vehicle object 210 in accordance with the movement of the vehicle 1 in the future position specified in Step S121. Specifically, the display form determination unit 1524H can determine the movement of the vehicle 1 in the future position from the information of the control plan of each of the acceleration device, the steering device, and the braking device included in the travel control plan. Thus, the display form determination unit 1524H determines the display form of the vehicle object 210 based on a result of the determination.

Since the scheduled travel trajectory is expressed by the function having the time as the variable, information of a speed plan can be acquired from a first-order differentiation of the function expressing the scheduled travel trajectory. Information of an acceleration plan can be acquired from a second-order differentiation. The information of the speed plan and the acceleration plan acquired in such a manner may be used.

Subsequently, in Step S123, the image data generation unit 1523 generates the image data for displaying the vehicle object 210 in the display form determined by the display form determination unit 1524H in the display position determined by the display position determination unit 1522E. Then, the image data generation unit 1523 outputs the generated image data to the HUD 110.

According to the embodiment 8, the effect similar to that in the embodiment 1 can be acquired. According to the embodiment 8, the future movement of the vehicle 1 can be expressed more specifically.

Although in the embodiment 8, the function of the display form determination unit 1524H is applied to the embodiment 5, the function of the display form determination unit 1524H can also be applied to the other embodiment.

Embodiment 9

Figures 34, 35:
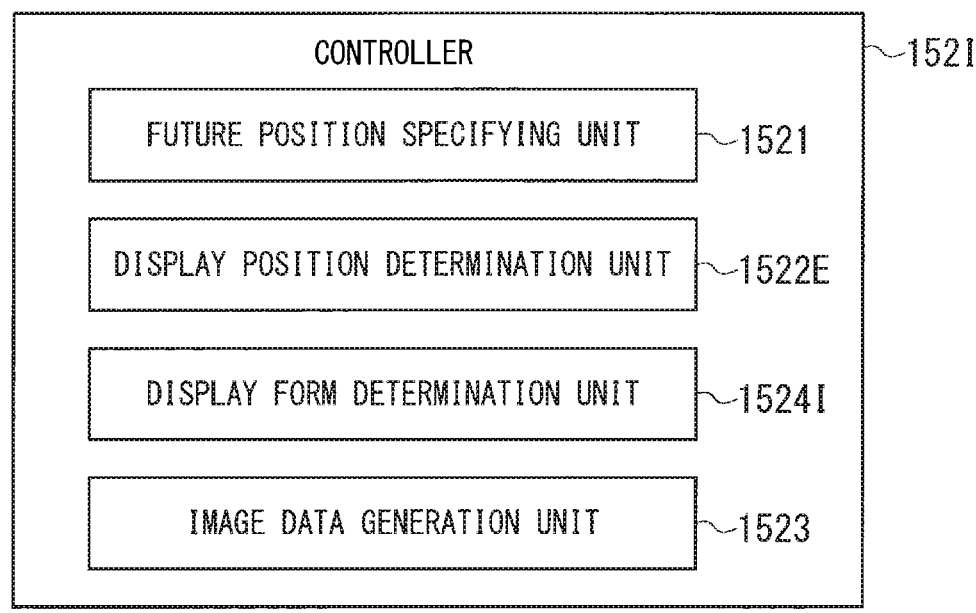
FIG. 34 A block diagram for describing a configuration of a controller of a display control apparatus according to an embodiment 9.
FIG. 35 A diagram for describing a display according to the embodiment 9.

In the embodiment 9, a display form of the vehicle object 210 is changed in accordance with a degree of change in the future movement of the vehicle 1. FIG. 34 illustrates a block diagram of a controller 152I according to the embodiment 9. The controller 152I is applied to the display control apparatus instead of the controller 152 which is described already. The controller 152I has a configuration that a display form determination unit 1524I is added to the controller 152E according to the embodiment 5.

Figure 36:
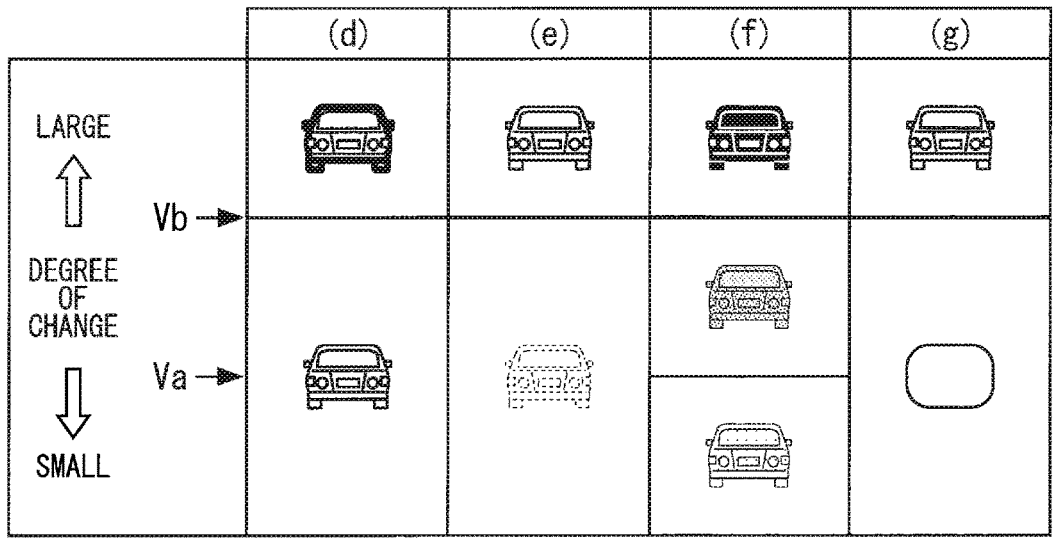
FIG. 36 A diagram for describing a display according to the embodiment 9.

The display form determination unit 1524I controls the display form of the vehicle object 210 so that visibility of the vehicle object 210 increases as the degree of change in the future movement of the vehicle 1 increases. The visibility of the vehicle object 210 can be changed under various types of control, and each of FIG. 35 and FIG. 36 illustrates a specific example.

As illustrated in FIG. 35, according to a control example (a), if a large movement in which the degree of change exceeds a threshold value Va is planned in the travel control plan, the display form determination unit 1524I increases the display size of the vehicle object 210 with respect to the large movement. If a larger movement in which the degree of change exceeds a larger threshold value Vb (>Va) is planned, the display form determination unit 1524I further increases the display size of the vehicle object 210 with respect to the larger movement.

In the control example (a), the display size of the vehicle object 210 is changed in three levels as described above. In the meanwhile, in a control example (b), the display size of the vehicle object 210 is changed in two levels. The threshold value Va may be adopted instead of the threshold value Vb in the control example (b).

According to a control example (c), particularly if a small movement in which the degree of change falls below the threshold value Vb is planned in the travel control plan, the display form determination unit 1524I does not display the vehicle object 210 with respect to the small movement. For example, the display form determination unit 1524I sets the vehicle object 210 to be transparent. Alternatively, the display form determination unit 1524I may instruct the image data generation unit 1523 to stop generating or outputting the image data. The threshold value Va may be adopted instead of the threshold value Vb in the control example (c). According to the control example (c), a processing amount and a consumed power of the display control apparatus, for example, can be reduced compared with a case of continuously displaying the vehicle object 210.

As illustrated in FIG. 36, according to a control example (d), if a large movement in which the degree of change exceeds the threshold value Vb is planned in the travel control plan, the display form determination unit 1524I applies a highlighted display to the vehicle object 210 with respect to the large movement. Although the highlighted display is provided by drawing the vehicle object 210 with a heavy line in FIG. 36, a drawing line may be changed to have a color having high visibility, or the vehicle object 210 may be painted with a color having the high visibility. The threshold value Va may be adopted instead of the threshold value Vb in the control example (d).

According to a control example (e), if a small movement in which the degree of change falls below the threshold value Vb is planned in the travel control plan, the display form determination unit 1524I displays the vehicle object 210 with a broken line with respect to the small movement. Accordingly, the visibility of the vehicle object 210 relatively increases when the degree of change exceeds the threshold value Vb. The threshold value Va may be adopted instead of the threshold value Vb in the control example (e).

According to a control example (f), if a small movement in which the degree of change falls below the threshold value Vb is planned in the travel control plan, the display form determination unit 1524I increases a degree of transparency of the vehicle object 210 with respect to the small movement. If a smaller movement in which the degree of change falls below the smaller threshold value Va (<b) is planned, the display form determination unit 1524I further increases the degree of transparency of the vehicle object 210 with respect to the smaller movement. Accordingly, the visibility of the vehicle object 210 relatively increases when the degree of change exceeds the threshold values Va and Vb. It is also applicable to adopt only one of the threshold values Va and Vb and change the degree of transparency in two levels. A hue of the vehicle object 210 may be changed instead of the degree of transparency.

According to a control example (g), if a small movement in which the degree of change falls below the threshold value Vb is planned in the travel control plan, the display form determination unit 1524I changes the vehicle object 210 to have a simple shape with respect to the small movement. Accordingly, the visibility of the vehicle object 210 relatively increases when the degree of change exceeds the threshold value Vb. The other simple shape differing from that in FIG. 36 may be adopted, and the threshold value Va may be adopted instead of the threshold value Vb.

Only the part of these examples of the display form may be adopted, or the other display form may also be adopted. The display forms to be changed may be combined with each other. The display form may be changed in four or more levels or continuously. Although the common threshold values Va and Vb are adopted in FIG. 35 and FIG. 36 for convenience of explanation, a different threshold value may be adopted for each display form to be changed.

Herein, the degree of change in the movement of the vehicle 1 can be expressed by a magnitude of acceleration of the vehicle 1, for example (in other words, an absolute value of the acceleration). That is to say, (the magnitude of) the acceleration changes when the vehicle 1 increases the speed, reduces the speed, and changes a travel direction, thus it is applicable to change the display form of the vehicle object 210 in accordance with the magnitude of the acceleration (for example, the threshold value Va=0.2 G and the threshold value Vb=0.4 G). The case where the vehicle 1 increases the speed includes a case where a state of the vehicle 1 changes from a stopping state to a traveling state. In the similar manner, the case where the vehicle 1 reduces the speed includes a case where a state of the vehicle 1 changes from the traveling state to the stopping state. The case where the vehicle 1 changes the travel direction includes a case where the vehicle 1 changes the traffic lane and a case where the vehicle 1 turns right and left.

It is also applicable to break down the movement of the vehicle 1 into the lateral direction motion component and the front-back direction motion component and compare a magnitude of acceleration of a motion component of one or both of the lateral direction motion component and the front-back direction motion component with a threshold value.

As described above, since the scheduled travel trajectory is expressed by the function having the time as the variable, information of an acceleration plan can be acquired from a second-order differentiation of the function expressing the scheduled travel trajectory.

Figure 37:
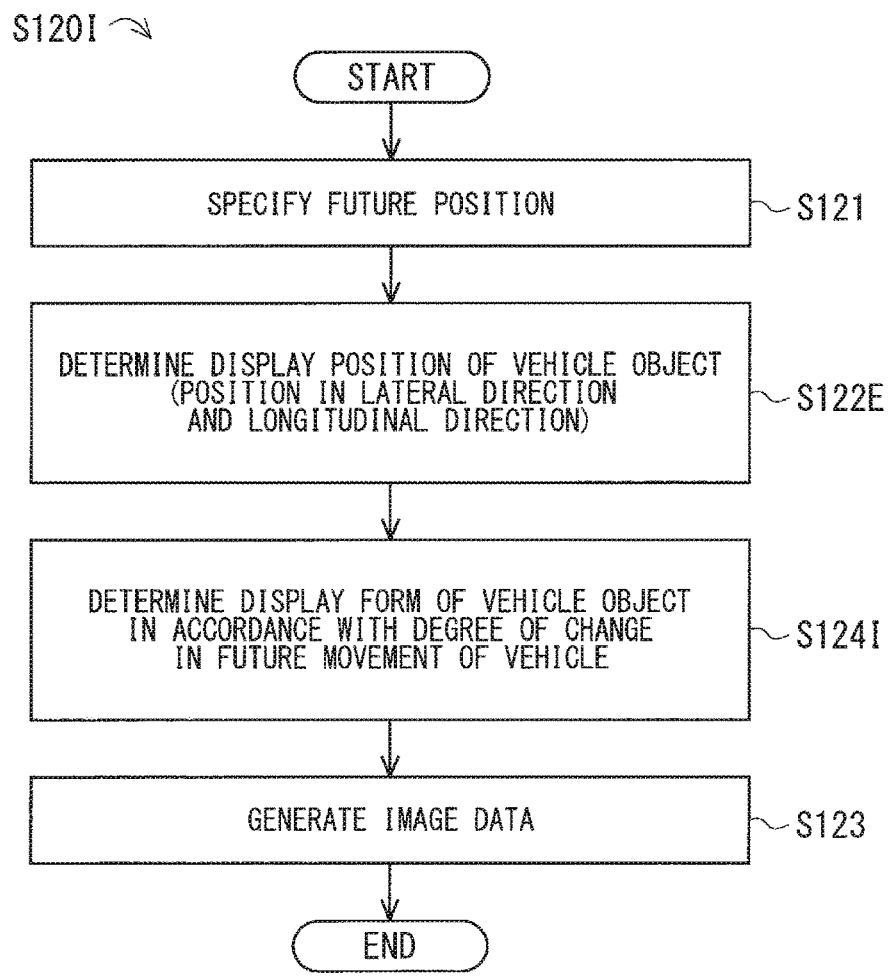
FIG. 37 A flow chart for describing an operation of the controller of the display control apparatus according to the embodiment 9.

FIG. 37 illustrates a flow chart on an operation of the controller 152I. According to an operation flow S1201 in FIG. 37, the future position specifying unit 1521 specifies the future position of the vehicle 1 in Step S121 in the manner similar to the embodiment 1. Next, in Step S122E, the display position determination unit 1522E determines the display position of the vehicle object 210 in the manner similar to the embodiment 5.

Next, in Step S1241, the display form determination unit 1524I determines the display form of the vehicle object 210 in accordance with the degree of change in the movement of the vehicle 1 in the future position specified in Step S121. Specifically, the display form determination unit 1524I assigns a future time to a formula in which a second-order differentiation is performed on a function expressing the scheduled travel trajectory, thereby specifying the acceleration of the vehicle 1 in the future position. Then, the display form determination unit 1524I compares a magnitude of the specified acceleration with a threshold value, and determines the display form of the vehicle object 210 based on a result of the comparison.

Subsequently, in Step S123, the image data generation unit 1523 generates the image data for displaying the vehicle object 210 in the display form determined by the display form determination unit 1524I in the display position determined by the display position determination unit 1522E. Then, the image data generation unit 1523 outputs the generated image data to the HUD 110.

According to the embodiment 9, the effect similar to that in the embodiment 1 can be acquired. According to the embodiment 9, the future movement of the vehicle 1 can be expressed more specifically.

Although in the embodiment 9, the function of the display form determination unit 1524I is applied to the embodiment 5, the function of the display form determination unit 1524I can also be applied to the other embodiment.

Embodiment 10

A case where a display is a liquid crystal display (LCD) is described in the embodiment 10. However, the display may also be an organic electroluminescence display, for example. FIG. 38 illustrates a block diagram for describing a display control apparatus 150J according to the embodiment 10 and an example of application thereof. The display control apparatus 150J includes the information acquisition unit 151 similar to that in the embodiment 1 and a controller 152J according to the embodiment 10. The display control apparatus 150J is combined with a display 110J (an LCD 110J herein), thereby being able to constitute a display apparatus 100J. According to FIG. 38, a background image data supply device 500 is added to the configuration in FIG. 1.

Figure 39:
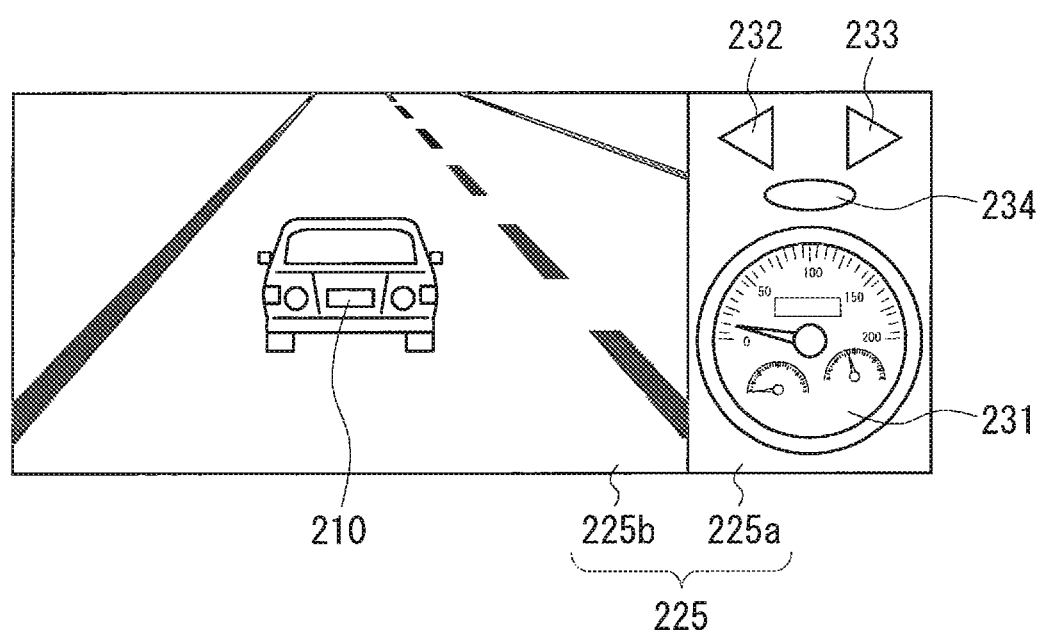
FIG. 39 A block diagram for describing a display configuration example of a display according to the embodiment 10.

Herein, the LCD 100J whose screen is disposed on a front side of a driver seat constitutes a meter cluster. However, the screen of the LCD 110J may be disposed in the other part such as a center console between the front side of the driver seat and a front side of a passenger seat, for example. FIG. 39 illustrates a configuration example of the screen (in other words, a display region) of the LCD 110J. According to FIG. 39, various meters 231, a directional signal indication lamps 232 and 233, and a brake indication lamp 234 are displayed in a display region 225a on a right side of the screen 225. The future movement of the vehicle 1 is displayed in the display region 225b on a left side of the screen 225 using the vehicle object 210. The vehicle object 210 is disposed in a center of the display region 225b on the left side.

Herein, a landscape with which the vehicle object 210 is overlapped is an image of a surrounding landscape in the future position, and the image of the surrounding landscape is provided by the background image data supply device 500. The image of the surrounding landscape is an image imitating a surrounding landscape by a computer graphics which is used in a navigation image, for example. In this case, a navigation system or a configuration block generating the navigation image in the navigation system falls under the background image data supply device 500.

Alternatively, an image captured with a vehicle exterior camera of the vehicle 1 may be used as an image of the surrounding landscape. Not only an unmodified captured image but also an image on which some kind of image processing (for example, processing for imitating a computer graphics) is performed falls under the captured image for the surrounding landscape. In this case, a vehicle exterior camera system or a combination of a vehicle exterior camera and an image processing system falls under the background image data supply device 500.

If the captured image is used, a sense of reality can further be achieved compared with a computer graphics image. According to the captured image, a processing load for generating the landscape image with which the vehicle object 210 is overlapped is reduced compared with the computer graphics image.

A display example of the LCD 110J is described with reference to FIG. 40. The vehicle 1 in FIG. 40 travels in the manner similar to that in FIG. 14.

When the current time is t30, the screen of the LCD 110J displays a state of the vehicle 1 in the future time t31 (=t30+Td). That is to say, the vehicle 1 is planned to travel in the left lane in the time t31, thus such a state is displayed. The vehicle 1 is planned to decrease the speed in the time t31, thus such a state is expressed in the display form in which the part of the vehicle object 210 corresponding to the brake lamp appears to light up. However, the vehicle 1 does not decrease the speed yet in the current time t30, thus the brake indication lamp 234 in the screen does not light up.

If the current time is t31, the brake indication lamp 234 in the screen lights up. In the current time t31, a state of the vehicle 1 in the future time t32 (=t31+Td) is displayed. That is to say, the vehicle 1 is planned to travel in a position closer to the center line in the time t32, thus such a state is displayed. The vehicle 1 is planned to blink the directional signal lamp in the time t32, thus such a state is expressed in the display form in which the part of the vehicle object 210 corresponding to the directional signal lamp appears to blink. However, the vehicle 1 does not blink the directional signal lamp yet in the current time t31, thus the directional signal indication lamp 233 in the screen does not blink.

If the current time is t32, the directional signal indication lamp 233 in the screen blinks. In the current time t32, a state of the vehicle 1 in the future time t33 (=t32+Td) is displayed. That is to say, the vehicle 1 is planned to travel in a position crossing the center line in the time t33, thus such a state is displayed. The vehicle 1 is planned to blink the directional signal lamp in the time t33, thus such a state is displayed.

If the current time is t33, the directional signal indication lamp 233 in the screen blinks. In the current time t33, a state of the vehicle 1 in the future time t34 (=t33+Td) is displayed. That is to say, the vehicle 1 is planned to travel in the right lane in the time t34, thus such a state is displayed.

If the current time is t34, a state of the vehicle 1 in the future time t34+Td is displayed. That is to say, the vehicle 1 is planned to travel in the right lane in the time t34, thus such a state is displayed.

Figure 40:
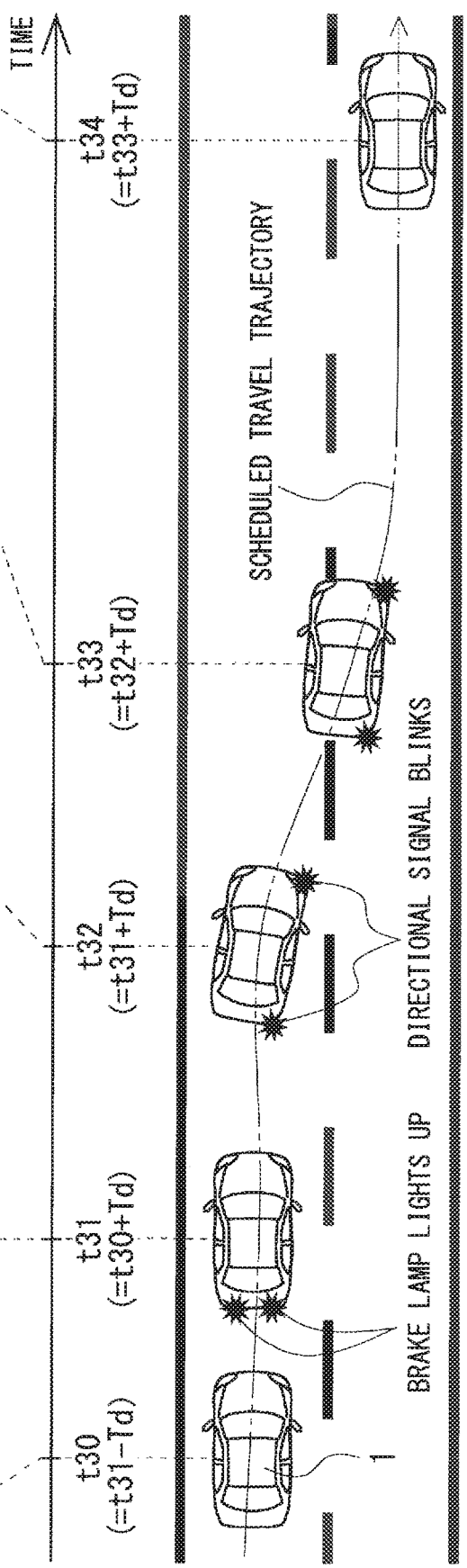
FIG. 40 A diagram for describing a display according to the embodiment 10.
Figure 41:
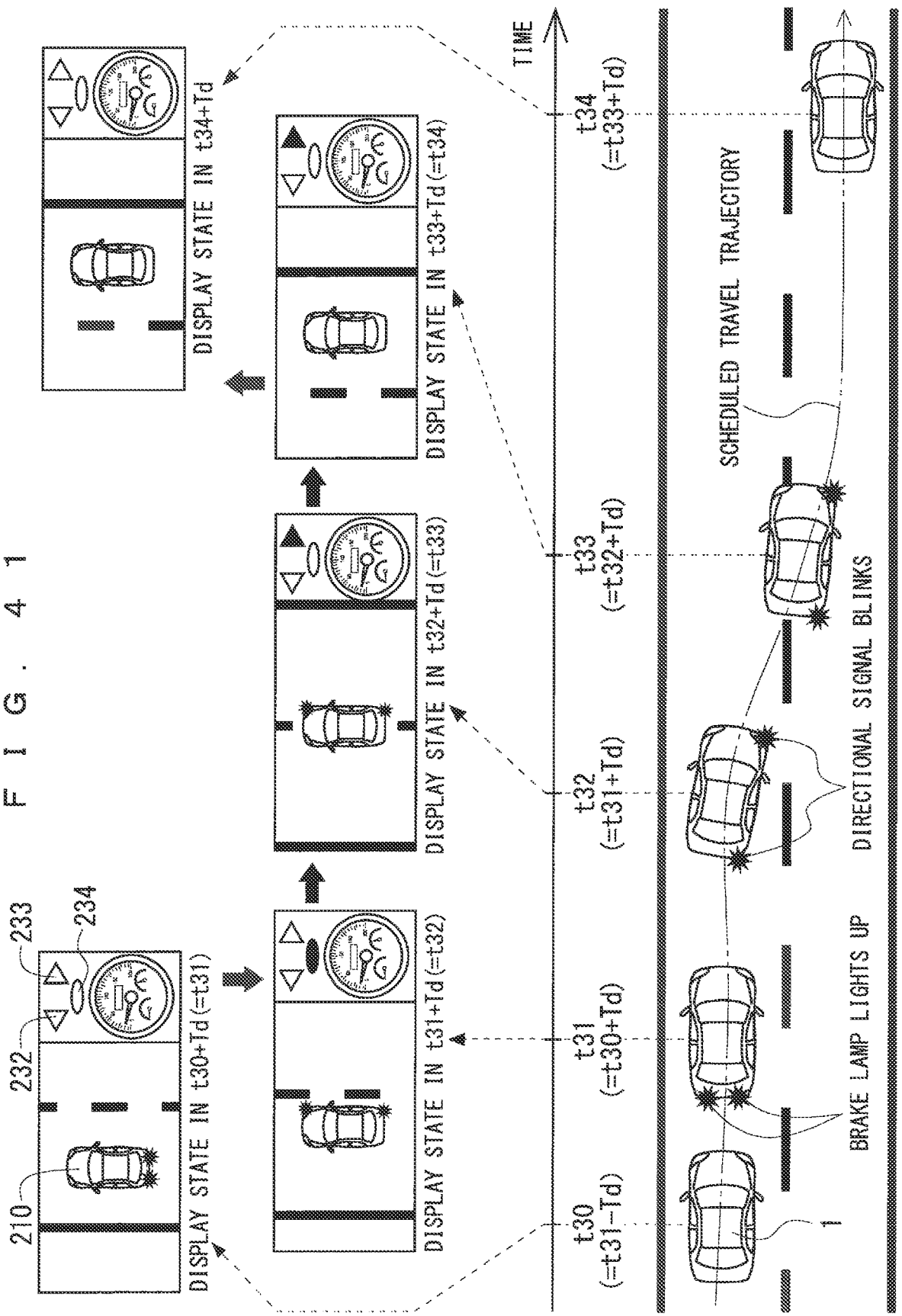
FIG. 41 A diagram for describing another display according to the embodiment 10.

In FIG. 40, the future movement of the vehicle 1 is displayed in a back view of the vehicle 1 in the manner similar to the case of the HUD 110, however, a viewpoint of seeing the vehicle 1 can be variously set according to the LCD 110J. FIG. 41 illustrates an example of a top view. The vehicle 1 can also be displayed in a bird's-eye view, for example. Since the viewpoint can be switched, the same contents can be provided by various expressions.

Figure 42:
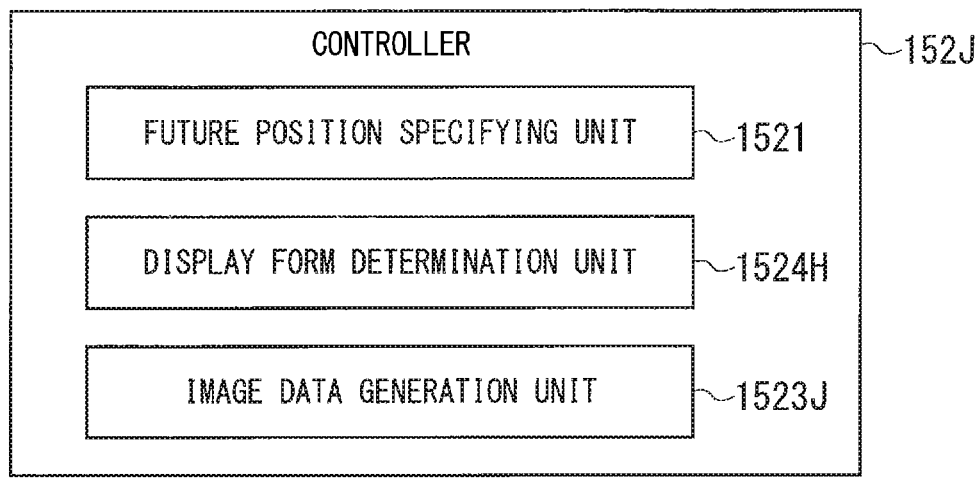
FIG. 42 A block diagram for describing a configuration of a controller of a display control apparatus according to the embodiment 10.
Figure 43:
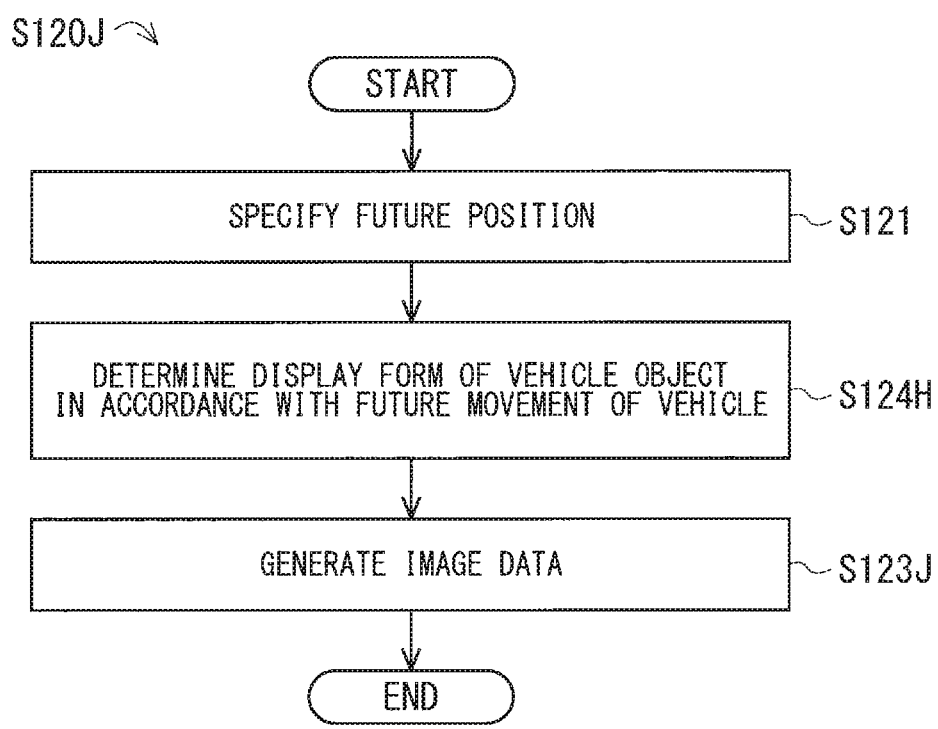
FIG. 43 A flow chart for describing an operation of the controller of the display control apparatus according to the embodiment 10.

FIG. 42 illustrates a block diagram of the controller 152J, and FIG. 43 illustrates a flow chart on an operation of the controller 152J. The controller 152J includes the future position specifying unit 1521, a display form determination unit 1522H, and an image data generation unit 1523J.

According to an operation flow S120J in FIG. 43, the future position specifying unit 1521 specifies the future position of the vehicle 1 in Step S121 in the manner similar to the embodiment 1. Next, in Step S124H, the display form determination unit 1524H determines the display form of the vehicle object 210 in the manner similar to the embodiment 8.

Next, in Step S123J, the image data generation unit 1523J acquires the image data of the surrounding landscape centering on the future position specified in Step S121 described above as the data of the background image from the background image data supply device 500. Then, the image data generation unit 1523J generates the data of the image in which the vehicle object 210 is disposed in a center of the acquired background image in the display form determined in Step S124H described above. Then, the image data generation unit 1523J outputs the generated image data to the LCD 110J.

The image data generation unit 1523J generates the image data of the whole screen 225, however, the description on the generation of the image for the display region 225a on the right side is omitted here.

According to the embodiment 10, the effect similar to that in the embodiment 1 can be acquired. According to the LCD 110J, the future movement of the vehicle 1 can be displayed while switching the viewpoint variously. According to the LCD 110J, the display apparatus can be provided at a low cost compared with the HUD 110. An LCD which is already provided in the vehicle can be used as the LCD 110J, thus an introduction cost can be reduced.

The embodiment 8 is applied to the display using the LCD 110J in the embodiment 10, however, the other embodiment can also be applied to the display using the LCD 110J.

Embodiment 11

Figure 44:
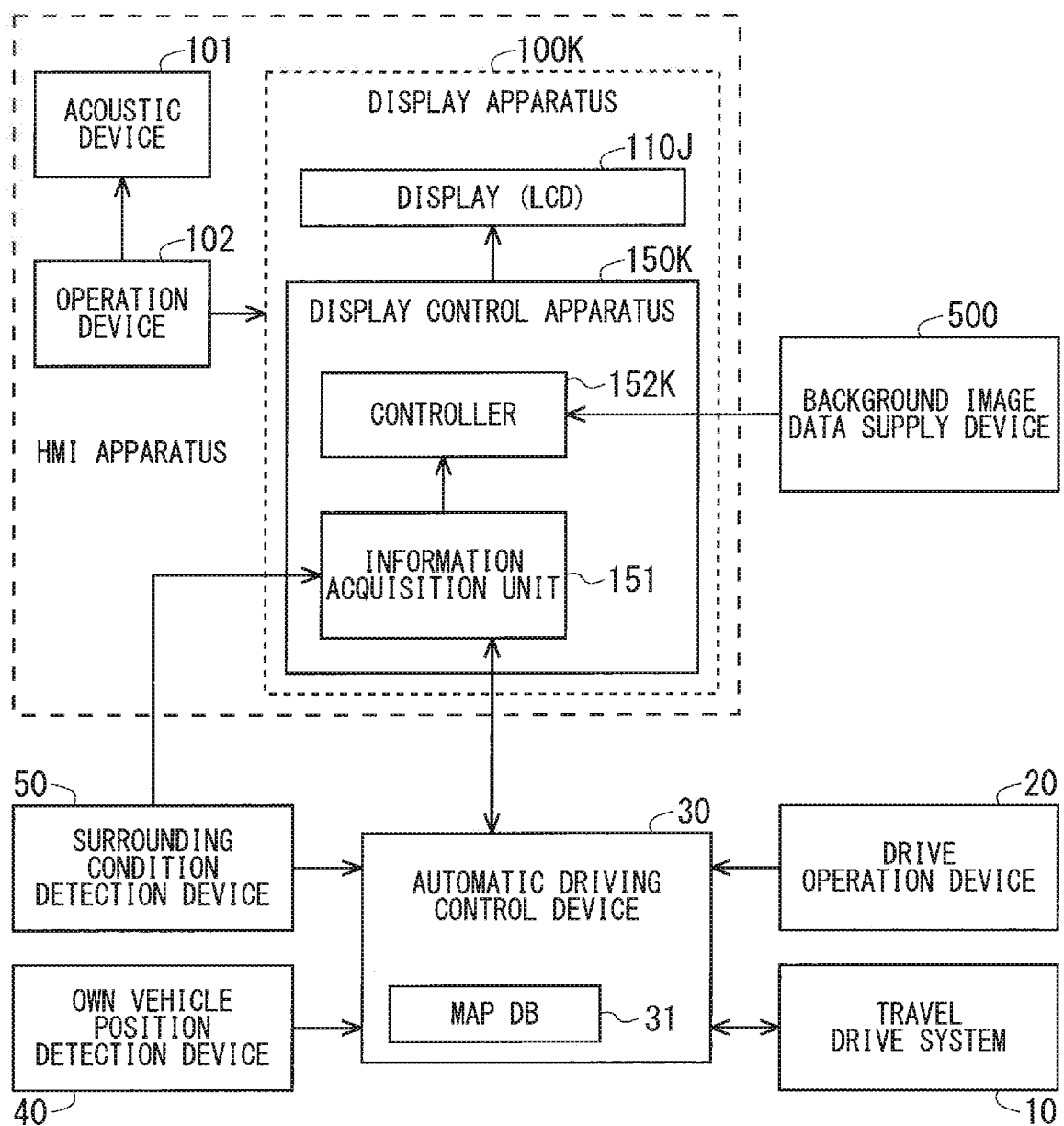
FIG. 44 A block diagram for describing a display control apparatus according to an embodiment 11 and an example of application thereof.

Described in the embodiment 11 is a technique for visually providing operation conditions of various apparatuses relating to the automatic driving. FIG. 44 illustrates a block diagram for describing a display control apparatus 150K according to the embodiment 11 and an example of application thereof. The display control apparatus 150K includes the information acquisition unit 151 similar to that in the embodiment 1 and a controller 152K according to the embodiment 11. The display control apparatus 150K is combined with the LCD 110J, thereby being able to constitute a display apparatus 100K. An organic electroluminescence display or an HUD, for example, can also be used as a display. The other configuration in FIG. 44 is similar to that in FIG. 38.

Figure 45:
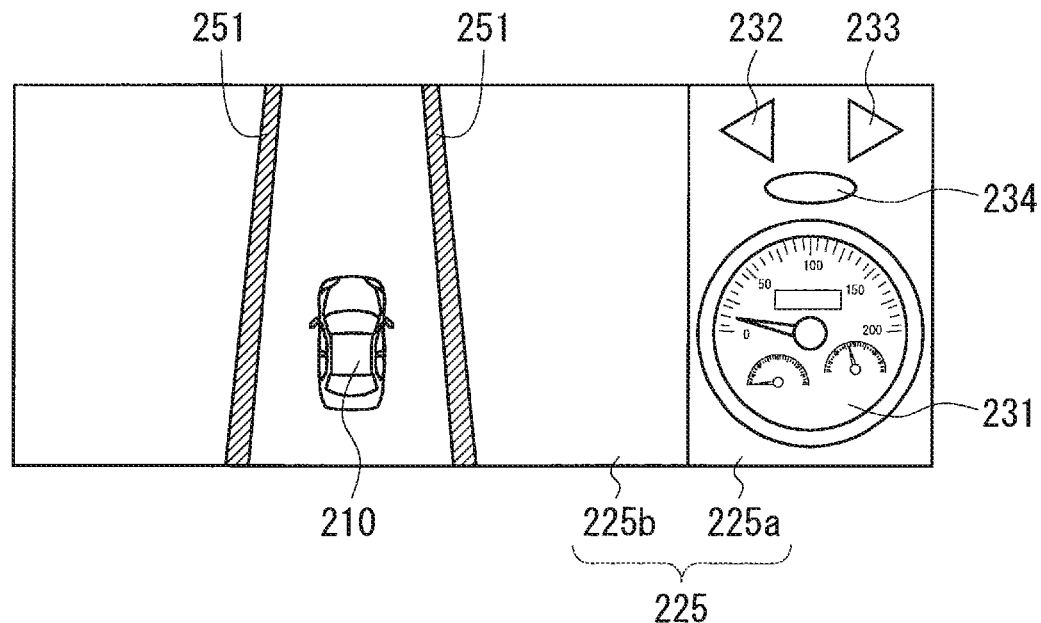
FIG. 45 A diagram for describing a display according to the embodiment 11.

A display example is described with reference to FIG. 45 to FIG. 48. In FIG. 45, the surrounding condition notification object 251 for the compartment line is displayed, thereby expressing a state that the surrounding condition detection device 50 already recognizes the compartment line compartmenting the traffic lane. The surrounding condition notification object 251 for the compartment line is a belt-like blue-colored display object, for example. The display form of the surrounding condition notification object 251 may be changed in accordance with a detection accuracy of the compartment line. For example, the surrounding condition notification object 251 is displayed with a broken line due to a decrease in the detection accuracy. The surrounding condition notification object 251 is displayed so that a positional relationship between the compartment line and the vehicle 1 in the actual space is reflected in a positional relationship between the surrounding condition notification object 251 and the vehicle object 210.

Figure 46:
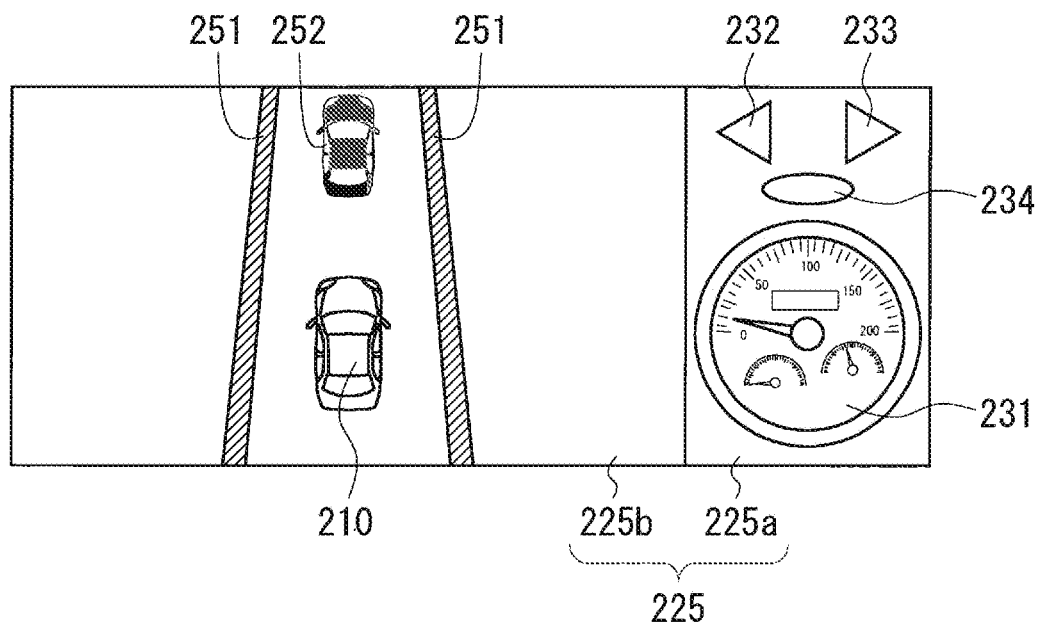
FIG. 46 A diagram for describing a display according to the embodiment 11.

Further displayed in FIG. 46 is a surrounding condition notification object 252 for a preceding vehicle. That is to say, the surrounding condition notification object 252 for the preceding vehicle is displayed, thereby expressing a state that the surrounding condition detection device 50 already recognizes the preceding vehicle. The surrounding condition notification object 252 for the preceding vehicle is a display object imitating a vehicle shape, for example. The surrounding condition notification object 252 for the preceding vehicle preferably has a design easily distinguished from the vehicle object 210 for the vehicle 1. The surrounding condition notification object 252 is displayed so that a positional relationship between the preceding vehicle and the vehicle 1 in the actual space is reflected in a positional relationship between the surrounding condition notification object 252 and the vehicle object 210.

It is also applicable to further transmit the notification of a recognized obstacle, for example, using the surrounding condition notification object.

Figure 47:
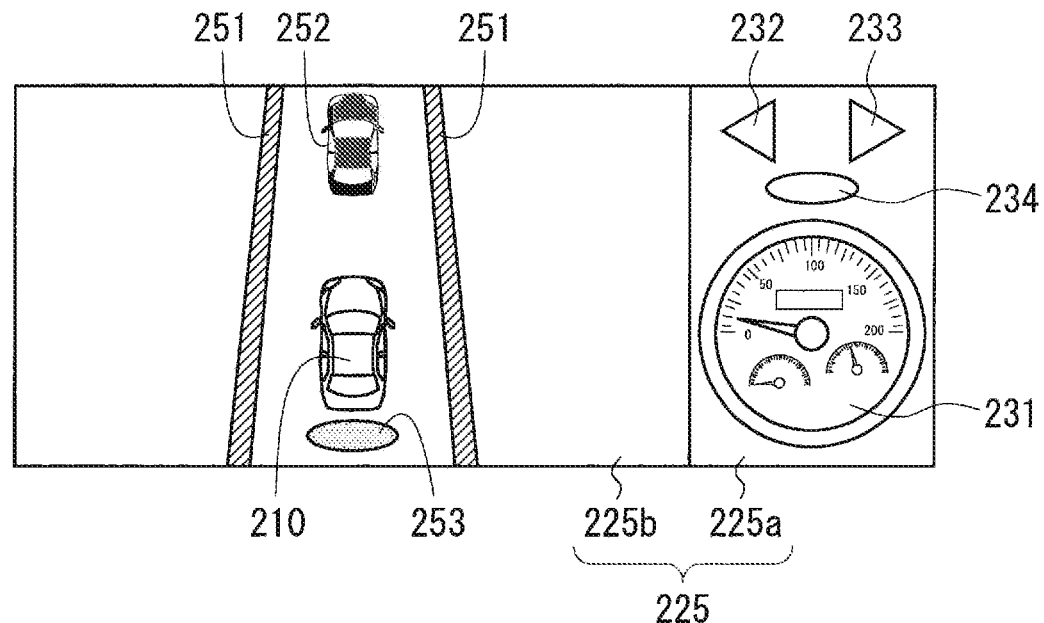
FIG. 47 A diagram for describing a display according to the embodiment 11.

A standby notification object 253 is further displayed in FIG. 47. The standby notification object 253 is a display object indicating that an automatic driving control object controlled in the automatic driving (the braking device herein) is ready for operation by the automatic driving control device 30. A design and a display position of the standby notification object 253 for the braking device are not limited to the example in FIG. 47. The design and the display position of the standby notification object is preferably changed for each automatic driving control object.

Figure 48:
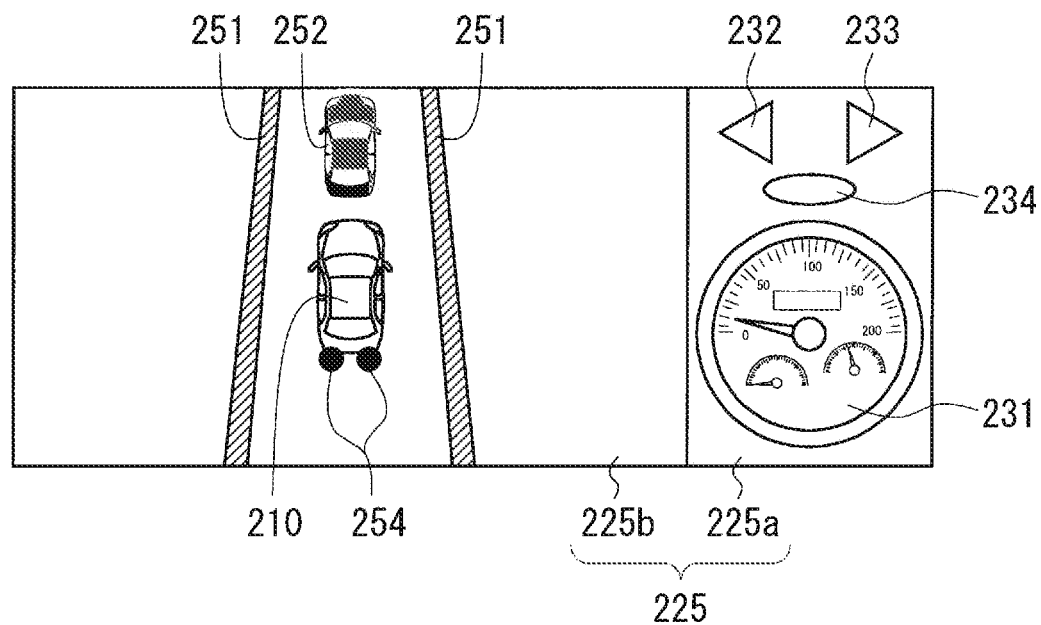
FIG. 48 A diagram for describing a display according to the embodiment 11.

The standby notification object 253 in FIG. 47 changes to a standby notification object 254 having a design illustrated in FIG. 48 before the braking device is actually operated (five seconds before, for example). Accordingly, the actual operation of the braking device can be preannounced. The standby notification object 254 may be displayed so that it blinks during an operation preannouncement period (for five seconds described above) and lights up during operation.

Figure 49:
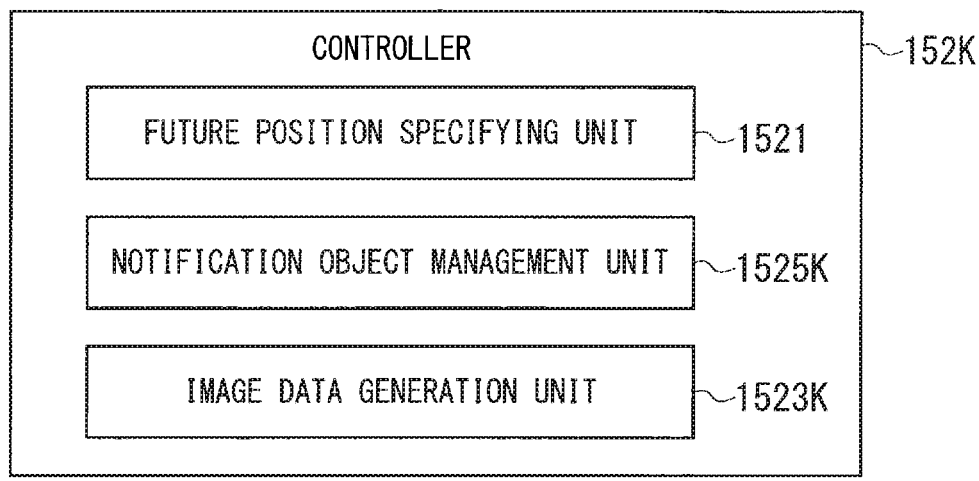
FIG. 49 A block diagram for describing a configuration of a controller of the display control apparatus according to the embodiment 11.
Figure 50:
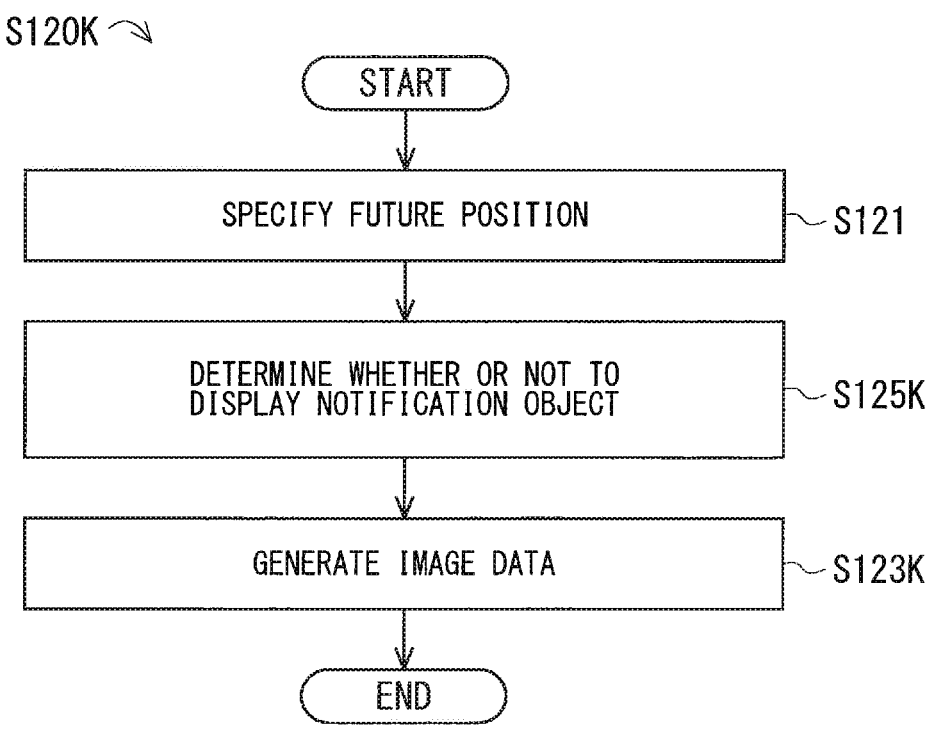
FIG. 50 A flow chart for describing an operation of the controller of the display control apparatus according to the embodiment 11.

FIG. 49 illustrates a block diagram of the controller 152K, and FIG. 50 illustrates a flow chart on an operation of the controller 152K. The controller 152K includes the future position specifying unit 1521, a notification object management unit 1525K, and an image data generation unit 1523K.

According to an operation flow S120K in FIG. 49, the future position specifying unit 1521 specifies the future position of the vehicle 1 in Step S121 in the manner similar to the embodiment 1.

Next, the notification object management unit 1525K determines whether or not to display the surrounding condition notification object and the standby notification object in Step S125K.

Specifically, the notification object management unit 1525K acquires the surrounding condition information used by the automatic driving control device 30 in the automatic driving via the information acquisition unit 151. The notification object management unit 1525K acquires the surrounding condition information from the surrounding condition detection device 50, however, the notification object management unit 1525K may acquire the surrounding condition information, with which the automatic driving control device 30 is provided by the surrounding condition detection device 50, from the automatic driving control device 30. Then, the notification object management unit 1525K instructs the image data generation unit 1523K to include the surrounding condition notification object in the image display with regard to a recognized object recorded in the surrounding condition information (the compartment line and the preceding vehicle are described above as the examples).

The notification object management unit 1525K acquires the information, which indicates whether or not the automatic driving control object controlled in the automatic driving is ready for operation by the automatic driving control device 30, from the automatic driving control device 30 via the information acquisition unit 151. Then, the notification object management unit 1525K instructs the image data generation unit 1523K to include the standby notification object in the image display with regard to the automatic driving control object which is ready for operation.

Next, the image data generation unit 1523K acquires the image data of the surrounding landscape centering on the future position specified in Step S121 described above as the data of the background image from the background image data supply device 500. Then, the image data generation unit 1523K generates the data of the display image in which the vehicle object 210 is disposed in the center of the acquired background image. The image data generation unit 1523K further adds the surrounding condition notification object and the standby notification object to the display image in accordance with the instruction issued from the notification object management unit 1525K in Step S125K described above. Subsequently, the image data generation unit 1523K outputs the generated image data to the LCD 110J.

The image data generation unit 1523K generates the image data of the whole screen 225, however, the description on the generation of the image for the display region 225a on the right side is omitted here.

According to the embodiment 11, the effect similar to that in the embodiment 10 can be acquired. The operation condition of the various apparatuses regarding the automatic driving can be confirmed by the display of the surrounding condition notification object and the standby notification object. As a result, a sense of safety on the automatic driving can be provided, for example.

The surrounding condition notification object and the standby notification object can also be adopted to the embodiments 1 to 10.

Modification Example

The display control apparatus is mounted on the vehicle in the above description. In the meanwhile, a part or all of the functions of the display control apparatus may be made up of at least one of an information terminal brought into the vehicle and a server on Internet. Examples of the information terminal include a personal computer and a smartphone, for example. If the server on Internet is used, a communication function of the information terminal may be used to access the server. A display unit of the information terminal may also be used as a display for displaying the vehicle object.

According to the present invention, the above embodiments can be arbitrarily combined, or each embodiment can be appropriately varied or omitted within the scope of the invention.

The present invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 1 vehicle, 30 automatic driving control device, 50 surrounding condition detection device, 100 to 100C, 100J, 100K display apparatus, 110 display (head-up display), 110J display (liquid crystal display), 150 to 150C, 150J, 150K display control apparatus, 151 information acquisition unit, 152, 152D to 152K controller, 153B, 153C adjustment unit, 200 windshield, 205, 225 display region, 210 vehicle object, 251, 252 surrounding condition notification object, 253, 254 standby notification object, 400 adjustment reference information supply device, 500 background image data supply device, Sd spatial interval, Td temporal interval.

The invention claimed is:

1. A display control apparatus controlling a display being used in a vehicle which can travel with automatic driving, comprising:
an information acquirer to acquire information of a travel control plan being generated by an automatic driving control device of the vehicle; and
a controller to acquire a future position which is a position of the vehicle after an elapse of a predetermined time from a current position of the vehicle from a future movement of the vehicle being planned by the travel control plan, and to control the display so that a user is visually provided with the future position of the vehicle by overlapping a vehicle object which is a display object imitating a vehicle shape with a landscape relating to the future position which is acquired,
wherein a display position of the vehicle object in the display is based on a positional relationship between the future position of the vehicle and a compartment line in the display.

2. The display control apparatus according to claim 1, wherein
the landscape with which the vehicle object is overlapped is an actual landscape viewed through a windshield in front of a driver seat, and
the display is a head-up display displaying the vehicle object on the actual landscape as a virtual image.

3. The display control apparatus according to claim 2, wherein
the controller specifies the future position of the vehicle based on the travel control plan, and controls the head-up display so that a virtual image distance increases as a distance from the future position to a current position of the vehicle increases.

4. The display control apparatus according to claim 1, wherein
the landscape with which the vehicle object is overlapped is a landscape image imitating a surrounding landscape in the future position of the vehicle, and
the controller specifies the future position of the vehicle based on the travel control plan, and controls the display so that an image in which the vehicle object is overlapped with the landscape image is displayed.

5. The display control apparatus according to claim 1, wherein
the landscape with which the vehicle object is overlapped is a captured image of a surrounding landscape in the future position of the vehicle, and
the controller specifies the future position of the vehicle based on the travel control plan, and controls the display so that an image in which the vehicle object is overlapped with the captured image is displayed.

6. The display control apparatus according to claim 1, wherein
the controller controls a display of the vehicle object so that the future movement of the vehicle is expressed by both a lateral direction motion component and a front-back direction motion component.

7. The display control apparatus according to claim 1, wherein
the controller controls a display of the vehicle object so that the future movement of the vehicle is expressed only by a lateral direction motion component.

8. The display control apparatus according to claim 1, wherein
the controller changes a display form of the vehicle object in accordance with the future movement of the vehicle.

9. The display control apparatus according to claim 8, wherein
the controller specifies the future position of the vehicle based on the travel control plan, and controls the display so that the vehicle object is displayed with a smaller size as a distance from the future position to the current position of the vehicle increases.

10. The display control apparatus according to claim 8, wherein
if a lighting or blinking of a vehicle exterior lamp is planned, the controller applies a display form, in which a part of the vehicle object corresponding to the vehicle exterior lamp appears to light up or blink, to the vehicle object.

11. The display control apparatus according to claim 8, wherein
the controller controls the vehicle object so that the vehicle object has a display form having an effect line corresponding to the future movement.

12. A display control apparatus controlling a display being used in a vehicle which can travel with automatic driving, comprising:
a processor to acquire information of a travel control plan being generated by an automatic driving control device of the vehicle; and
a controller to control the display so that a user is visually provided with a future movement of the vehicle being planned by the travel control plan by overlapping a vehicle object which is a display object imitating a vehicle shape with a landscape relating to the future movement, wherein
the controller changes a display form of the vehicle object in accordance with a degree of change in the future movement of the vehicle, and
if a small movement in which the degree of change falls below a threshold value is planned, the controller controls the display so that the vehicle object is not displayed with respect to the small movement.

13. The display control apparatus according to claim 12, wherein
if a large movement in which the degree of change exceeds a threshold value is planned, the controller controls the display so that visibility of the vehicle object is further increased with respect to the large movement.

14. The display control apparatus according to claim 1, wherein
the controller acquires surrounding condition information which the automatic driving control device uses in the automatic driving, and controls the display so that the display displays a surrounding condition notification object for transmitting a notification of a recognized object recorded in the surrounding condition information.

15. The display control apparatus according to claim 1, wherein
the controller controls the display so that the display displays a standby notification object which is a display object indicating that an automatic driving control object being controlled in the automatic driving is ready for operation by the automatic driving control device.

16. The display control apparatus according to claim 1, wherein
the controller specifies the future position of the vehicle based on the travel control plan, and determines the display position of the vehicle object in accordance with the future position, and
the future position is a position which the vehicle is scheduled to reach with an interval from a predetermined starting point, and
the display control apparatus further comprising
an adjuster to adjust the interval in accordance with an instruction of a user.

17. The display control apparatus according to claim 1, wherein
the controller specifies the future position of the vehicle based on the travel control plan, and determines the display position of the vehicle object in accordance with the future position, and
the future position is a position which the vehicle is scheduled to reach with an interval from a predetermined starting point, and
the display control apparatus further comprising
an adjuster to adjust which to use, a temporal interval or a spatial interval as the interval, in accordance with at least one of a travel condition, a surrounding condition, and a driver condition.

18. A display apparatus, comprising:
the display control apparatus according to claim 1; and
a display displaying the vehicle object under control of the display control apparatus.

19. A display control method controlling a display being used in a vehicle which can travel with automatic driving, comprising:
acquiring information of a travel control plan being generated by an automatic driving control device of the vehicle;
acquiring a future position which is a position of the vehicle after an elapse of a predetermined time from a current position of the vehicle from a future movement of the vehicle being planned by the travel control plan;

controlling the display so that a user is visually provided with the future position of the vehicle by overlapping a vehicle object which is a display object imitating a vehicle shape with a landscape relating to the future position which is acquired; and determining a display position of the vehicle object in the display based on a positional relationship between the future position of the vehicle and a compartment line in the display.

* * * * *